United States Patent Office 3,216,998
Patented Nov. 9, 1965

3,216,998
11β,18;18,20-DIEPOXY STEROIDS OF THE PREGNANE SERIES
Philip F. Beal III and John E. Pike, Kalamazoo, Mich., assignors to The Upjohn Company, Kalamazoo, Mich., a corporation of Delaware
No Drawing. Filed Apr. 2, 1964, Ser. No. 356,945
21 Claims. (Cl. 260—239.55)

This invention relates to certain novel and therapeutically useful 11β,18;18,20β-diepoxy and 11β,18;18,20α-diepoxy steroids of the pregnane series.

This application is a continuation-in-part of copending application Serial No. 25,824, filed May 2, 1960.

The novel compounds of this invention are illustratively represented by the following formulae:

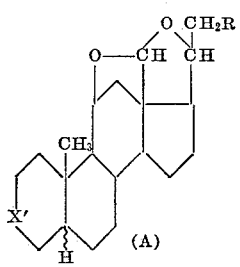 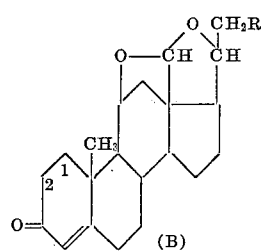

(A)                                (B)

wherein R is hydrogen, hydroxy or OAc in which Ac is the acyl radical of an organic carboxylic acid preferably a hydrocarbon carboxylic acid containing from 1 to 12 carbon atoms, inclusive, X is the carbonyl radical (>C=O) or the β-hydroxymethylene radical

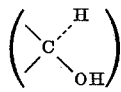

X' is the carbonyl radical (>C=O), the hydroxymethylene radical

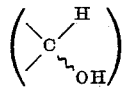

or an acylated hydroxymethylene radical

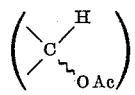

in which Ac has the same meaning as given above, the 1,2-carbon atom linkage is a single bond linkage or a double bond linkage, and the configuration of the carbon to oxygen linkage at the 20-position is α (alpha) or β (beta).

In this application the wavy line ($) appearing at the 3-, 5- and 20-positions is a generic expression consisting of the α (alpha) configuration, the β (beta) configuration, and mixtures thereof.

The compounds of this invention represented by Formulae A and B, above, are highly potent cortical hormones having salt and water regulating, anti-inflammatory, progestational, central nervous system depressant, muscle relaxant, cardiotonic, anti-hypertensive and antihormonal activities; the compounds of Formulae A and B are typified by the following: (A) 11β,18;18,20β-diepoxy-5β-pregnan-3α-ol, 11β,18;18,20β-diepoxy-5β-pregnane-3α,21-diol, 11β,18;18,20β-diepoxy-5β-pregnan-3-one, 11β,18;18,20β-diepoxy-21-hydroxy-5β-pregnan-3-one, 11β,18;18,20α-diepoxy-5β-pregnan-3α-ol, 11β,18;18,20α-diepoxy-5β-pregnane-3α,21-diol, 11β,18;18,20α-diepoxy-5β-pregnan-3-one, 11β,18;18,20α-diepoxy-21-hydroxy-5β-pregnan-3-one, the acylates thereof, and the corresponding 3β,5α-epimers; and (B) 11β,18;18,20β-diepoxy-4-pregnen-3-one, 11β,18;18,20β-diepoxy-21-hydroxy-4-pregnen-3-one, 11β,18;18,20α-diepoxy-4-pregnen-3-one, 11β,18;18,20α-diepoxy-21-hydroxy-4-pregnen-3-one, the corresponding 1-dehydro compounds and the 21-acylates of the 21-hydroxy compounds.

Other compounds of this invention, as well as being useful as intermediates in the production of the above described compounds, also possess useful physiological activities, including salt and water regulating, anti-inflammatory, progestational, central nervous system depressant, cardiotonic and antihormonal activities. Among these are the compounds represented by Formulae XVI, XVII and XVIII.

The novel compounds of this invention can be prepared and administered to birds and mammals, including valuable domestic animals, in a wide variety of oral or parenteral dosage forms singly, or in admixture with other coacting compounds. They can be associated with a pharmaceutical carrier which can be a solid material or a liquid in which the compound is dissolved, dispersed or suspended. The solid compositions can take the forms of tablets, powders, capsules, pills or the like, preferably in unit dosage forms for simple administration or precise dosages. The liquid compositions can take the form of solutions, emulsions, suspensions, syrups or elixirs. The novel compounds can also be administered topically in the form of ointments, creams, lotions, and the like, with or without coacting antibiotics, germicides or other materials forming advantageous compositions therewith.

The compounds and processes of this invention are illustratively represented by the following sequence of formulae.

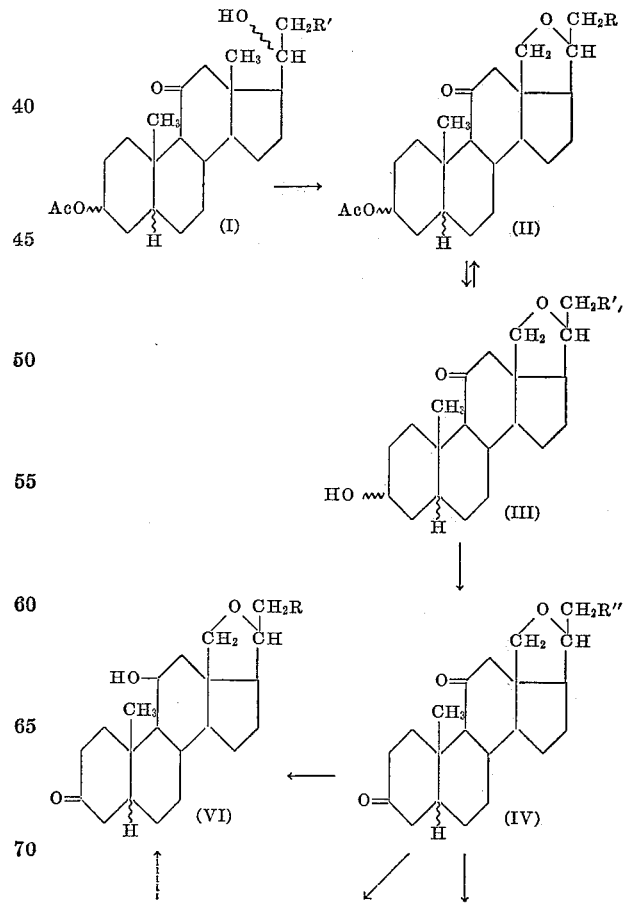

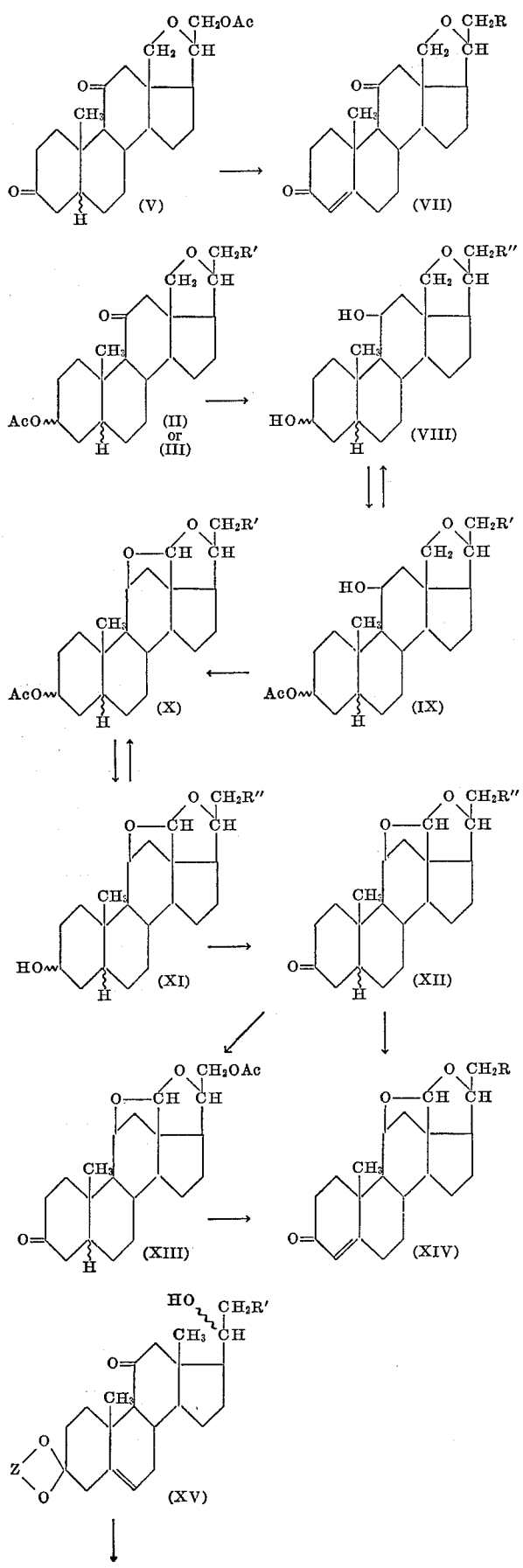
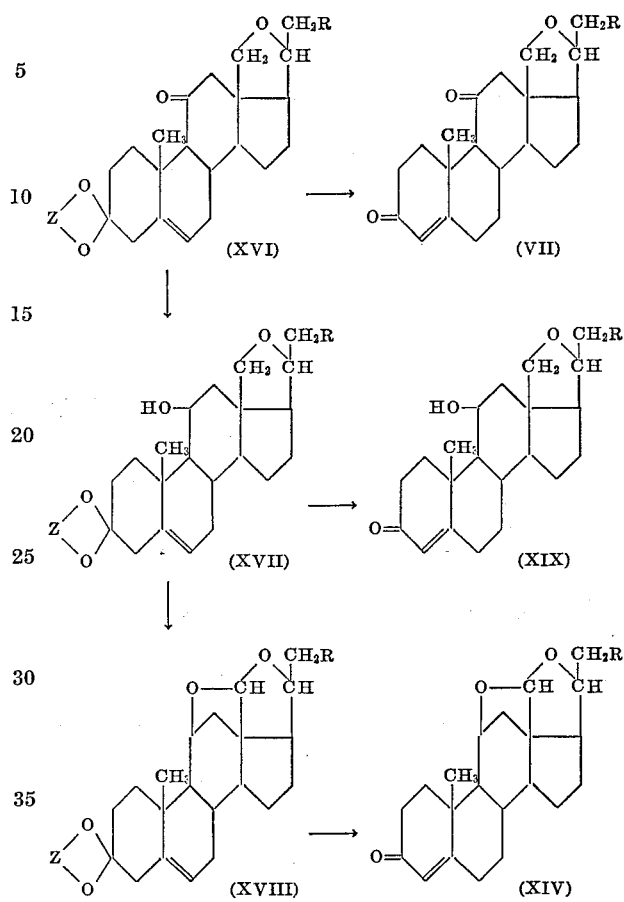

wherein Ac and R have the same meanings as previously given, R' is hydrogen or OAc in which Ac has the same meaning as previously given, R" is hydrogen or hydroxy, Z is a lower alkylene radical containing from 2 to 8 carbon atoms, inclusive, and from 2 to 3 carbon atoms, inclusive, in the chain connecting the oxygen atoms, e.g., ethylene, trimethylene, 2,2-dimethyltrimethylene, n-propyl-ethylene, 1,1,2,2-tetramethylethylene and the configuration of the carbon to oxygen linkage at the 20-position is α (alpha) or β (beta).

Starting materials for this invention are 3α,20β-dihydroxy-5β-pregnan-11-one 3-acylate (I), 3β,20β-dihydroxy-5α-pregnan-11-one 3-acylate (I), 3α,20β,21-trihydroxy-5β-pregnan-11-one 3,21-diacylate (I), 3β,20β,21-trihydroxy-5α-pregnan-11-one 3,21-diacylate (I), 3α,11β,20β-trihydroxy-5β-pregnane 3-acylate, 3β,11β,20β-trihydroxy-5α-pregnane 3-acylate, 3α,11β,20β,21-tetrahydroxy-5β-pregnane 3,21-diacylate, 3β,11β,20β,21-tetrahydroxy-5α-pregnane 3,21-diacylate, 20β-hydroxy-4-pregnene-3,11-dione 3-alkylene ketal (XV), 20β,21-dihydroxy-4-pregnene-3,11-dione 3-alkylene ketal 21-acylate (XV), 11β,20β-dihydroxy-4-pregnen-3-one 3-alkylene ketal and 11β,20β,21-trihydroxy-4-pregnen-3-one 3-alkylene ketal 21-acylate, and the corresponding 20α-epimers thereof, wherein acyl is the acyl radical of an organic carboxylic acid preferably a hydrocarbon carboxylic acid containing from 1 to 12 carbon atoms, inclusive, and wherein the alkylene radical contains from 2 to 8 carbon atoms, inclusive, and from 2 to 3 carbon atoms, inclusive, in the chain connecting the oxygen atoms. The compounds wherein the acyl radical is acetyl and wherein the alkylene group is ethylene are the preferred starting materials.

The above listed starting materials are prepared by subjecting the corresponding 20-keto compounds which are known in the art to reduction at the 20-position using sodium borohydride as the reducing agent in accordance

ROUTE 1

In carrying out the process of Route 1 of this invention, the compounds of Formula I, i.e., 3α,20β-dihydroxy-5β-pregnan-11-one 3-acylate, 3α,20β,21-trihydroxy-5β-pregnan-11-one 3,21-diacylate or the corresponding 3β,5α-epimers are epoxidized with lead tetraacetate in the presence of a suitable solvent inert to the reaction such as benzene, toluene, xylene, hexane, cyclohexane, methylcyclohexane and the like at a temperature of from about 0° C. to the boiling temperature of the solvent, to give the corresponding 18,20β-epoxy compounds (II). The compounds of Formula II are then hydrolyzed with base in accordance with known methods, e.g., dilute alcoholic sodium or potassium hydroxide solution, to produce the corresponding free hydroxy compounds of Formula III. The compounds of Formula III thus produced, can be re-esterified to the corresponding 3-acylates and 3,21-diacylates, respectively, of Formula II by reaction with the selected acylating agent. This reaction can be performed under the esterification conditions known in the art, e.g., by the reaction of III with the selected acid chloride or acid bromide or the anhydride of an organic carboxylic acid, or by reaction with the selected acid in the presence of an esterification catalyst, for example, p-toluenesulfonyl chloride, trifluoroacetic anhydride, p-toluenesulfonic acid, trifluoroacetic acid, sulfuric acid, and the like, or with an ester under ester exchange reaction conditions. Compounds thus produced include those wherein Ac is the acyl radical of a hydrocarbon carboxylic acid containing from 1 to 12 carbon atoms, inclusive, e.g., the acids listed in Example 3.

The compounds of Formula II or the corresponding free hydroxy compounds of Formula III are reduced at the 11-position with lithium aluminum hydride or other carbonyl reducing agent in an organic solvent or mixtures of organic solvents, e.g., ether, dioxane, tetrahydrofuran, benzene, toluene and the like, to produce the corresponding 18,20β-epoxy-11β-hydroxy compounds of Formula VIII. When the starting material is a 3-acylate or 3,21-diacylate (III) the acylate group is removed during the reaction to give the corresponding free hydroxy compound VIII, which can be re-esterfied to give the corresponding 3-acylate and 3,21-diacylate (IX), respectively, by the known acylation methods, e.g., those disclosed above for converting III to II.

The 18,20β-epoxy-11β-hydroxy compounds of Formula IX are then epoxidized with lead tetraacetate in the presence of a suitable solvent such as benzene, toluene, xylene, hexane, cyclohexane, methylcyclohexane and the like, at a temperature from about 0° C. to the boiling point of the solvent to give the 11β,18;18,20β-diepoxy compounds of Formula X.

Alternatively the compounds of Formula X can be prepared from 3α,11β,20β-trihydroxy-5β-pregnan-3-one 3-acylate, 3α,11β,20β,21-tetrahydroxy-5β-pregnan-3-one 3,21-diacylate or the corresponding 3β,5α-epimers thereof by diepoxidation with lead tetraacetate in accordance with the procedure disclosed above for epoxidation of IX to X, but using an appropriately increased amount of lead tetraacetate.

The 11β,18;18,20β-diepoxy compounds of Formula X are then hydrolyzed to the corresponding free alcohols of Formula XI in accordance with the procedures previously disclosed for hydrolyzing II to III.

The 3α-hydroxy-18,20β-epoxy-5β-pregnan-11-one (III), 3α-hydroxy-11β,18;18,20β-diepoxy-5β-pregnane (XI) and the corresponding 3β,5α-epimers are oxidized at the 3-position by known methods, e.g., with an N-haloamide or an N-haloimide in pyridine, with chromic anhydride or chromium trioxide and dilute sulfuric acid in acetone or methylene chloride, with sodium dichromate in glacial acetic acid, or other known oxidizing agents to produce the corresponding 3-keto compounds of Formula IV and XII.

The 3,21-dihydroxy compounds of Formulae III and X are oxidized at the 3-position (Oppenauer oxidation) with a ketone, e.g., acetone or cyclohexanone, in the presence of aluminum isopropoxide, to give the corresponding 3-keto-21-hydroxy compounds of Formula IV and XII, which can be acylated at the 21-position in accordance with known 21-acylation methods, e.g., the procedures disclosed above for acylating III to II to give the corresponding 21-acylates represented by Formula V and XIII.

The 3-keto compounds of Formula IV can be converted to the corresponding 11β-hydroxy compounds of Formula VI by ketalizing the 3-position with an alkylene glycol according to the method of U.S. Patent 2,707,184 or 2,758,993 or with the acetal of a lower-alkylene glycol, e.g., dioxolane, 2-methyl-2-ethyldioxolane, in the presence of an acid catalyst, e.g., p-toluenesulfonic acid, concentrated sulfuric acid, boron trifluoride, etc., to produce the corresponding 3-cyclic ketals. Ethylene glycol is the preferred ketalizing agent.

The 3-ketalized compounds of Formula IV, thus produced, are then reduced at the 11-position with lithium aluminum hydride or other carbonyl reducing agent in an organic solvent or mixtures of organic solvents, e.g., ether, dioxane, tetrahydrofuran, benzene, toluene, and the like, to produce the corresponding 3-ketalized 11β-hydroxy compounds which are then hydrolyzed by known methods for hydrolyzing cyclic ketal groups, e.g., dilute sulfuric acid, according to the method of U.S. Patents 2,707,184 or 2,758,993 for hydrolyzing 3-cyclic ketals, to give the compounds of Formula VI. The 21-acyloxy compounds of Formula V, can likewise be ketalized and reduced to give the corresponding 21-hydroxy compounds of Formula VI.

The 21-hydroxy compounds of Formula VI can be esterified at the 21-position in accordance with known 21-acylation methods, e.g., the procedures disclosed above for the acylation of III to II to give the corresponding 21-acylates represented by Formula VI.

The 21-desoxy-5β-pregnanes of Formulae IV and XII and the 21-acyloxy-5β-pregnanes of Formulae V and XIII, i.e., 18,20β-epoxy-5β-pregnane-3,11-dione (IV), 11β,18;18,20β-diepoxy-5β-pregnan-3-one (XII), 18,20β-epoxy-21-hydroxy-5β-pregnane-3,11-dione 21-acetate (V) and 11β,18;18,20β-diepoxy-21-hydroxy-5β-pregnan-3-one 21-acylate (XIII) are then treated with a halogenating agent, e.g., a hypohalous acid, a mineral acid with a hypochlorite, such as t-butylhypochlorite, N-bromoacetamide, N-bromosuccinimide, N-chloroacetamide, N-chlorosuccinimide and the like, to give the corresponding 4β-halo-18,20β-epoxy-5β-pregnane-3,11-dione, the corresponding 4β - halo-11β,18;18,20β-diepoxy-5β-pregnane-3-one, the corresponding 4β-halo-18,20β-epoxy-21-hydroxy-5β-pregnane-3,11-dione 21-acylate and the corresponding 4β-halo-11β,18;18,20β - diepoxy-5β-pregnan-3-one 2-acylate, respectively. The 4-halo compound thus obtained can be converted to the corresponding Δ⁴ compound according to the procedures disclosed in U.S. Patent 2,794,814, e.g., by treatment with semicarbazide hydrochloride followed by pyruvic acid, to give the corresponding Δ⁴-compounds of Formulae VII and XIV, i.e., 18,20β-epoxy-4-pregnene-3,11-dione (VII), 11β,18;18,20β-diepoxy-4-pregnen-3-one (XIV), 18,20β-epoxy-21-hydroxy-4-pregnene-3,11-dione 21-acylate (VII) and 11β,18;18,20β-diepoxy-21-hydroxy-4-pregnen-3-one 21-acylate (XIV), respectively.

The 3-keto-5α-pregnanes of Formulae IV, V, XII and XIII are converted to the corresponding Δ⁴-compounds of Formulae VII and XIV by methods known in the art, Rosenkranz et al., J. Am. Chem. Soc., 72, 4077 (1950), e.g., by bromination of the selected 3-keto-5α-pregnane to give the corresponding 2α,4α-dibromo derivative followed by reaction with sodium iodide to give the corresponding 2-iodo-4-pregnene which on deiodination with chromus chloride, collidine or zinc dust gives the corresponding $\Delta^4$-3-ketones of Formulae VII and XIV.

ROUTE 2

In carrying out the process of Route 2 of this invention, the compounds of Formula XV, i.e., 20β-hydroxy-4-pregnene-3,11-dione 3-alkylene ketal and 20β,21-dihydroxy-4-pregnene-3,11-dione 3-alkylene ketal 21-acylate, are epoxidized with lead tetraacetate in accordance with the procedures disclosed above for converting I to II to give the corresponding 18,20β-epoxy compounds of Formula XVI, i.e., 18,20β-epoxy-4-pregnene-3,11-dione 3-alkylene ketal and 18,20β-epoxy-21-hydroxy-4-pregnene-3,11-dione 3-alkylene ketal 21-acylate, respectively. The 21-acylates thus obtained are then hydrolyzed in accordance with known methods for hydrolyzing hydrocortisone 21-acylates to hydrocortisone, e.g., sodium or potassium bicarbonate in aqueous alcohol in an oxygen free atmosphere to give the corresponding 18,20β-epoxy-21-hydroxy-4-pregnene-3,11-dione 3-alkylene ketal (XVI).

The compounds of Formula XVI are then reduced at the 11-position with lithium aluminum hydride or other carbonyl reducing agent in the same manner as disclosed in Route 1, above, to produce the corresponding 11β-hydroxy compounds of Formula XVII, i.e., 11β-hydroxy-18,20β-epoxy-4-pregnen-3-one 3-alkylene ketal and 11β,21-dihydroxy-18,20β-epoxy-4-pregnen-3-one 3-alkylene ketal. When the starting material is the 21-acylate, the acyloxy group is hydrolyzed during the course of the reaction to give the corresponding 21-free alcohol (XVII). The 21-free alcohols of Formula XVII, thus obtained, are esterified at the 21-position in accordance with known acylation procedures, e.g., those disclosed above for converting III to II, to give the corresponding 21-acylates represented by Formula XVII.

The compounds of Formula XVII, i.e., 11β-hydroxy-18,20β-epoxy-4-pregnen-3-one 3-alkylene ketal and 11β,21-dihydroxy-18,20β-epoxy-4-pregnen-3-one 3-alkylene ketal 21-acylate, the acetates being preferred, are epoxidized with lead tetraacetate in accordance with the procedure disclosed above for converting IX to X, to give the corresponding diepoxy compounds of Formula XVIII, i.e., 11β,18;18,20β-diepoxy-4-pregnen-3-one 3-alkylene ketal and 11β,18;18,20β-diepoxy-4-pregnen-3-one 3-alkylene ketal 21-acylate, respectively.

Alternatively the 21-desoxy and 21-acyloxy compounds of Formula XVIII can be produced by the diepoxidation of 11β,20β-dihydroxy-4-pregnen-3-one 3-alkylene ketal and 11β,20β,21-trihydroxy-4-pregnen-3-one 3-alkylene ketal 21-acylate with lead tetraacetate in accordance with the alternative procedure described in Route 1 for producing the compounds of Formula X directly from the corresponding 11β,20β-dihydroxy compounds, to give the corresponding diepoxy compounds of Formula XVIII, i.e., 11β,18;18,20β-diepoxy-4-pregnen-3-one 3-alkylene ketal and 11β,18;18,20β-diepoxy-21-hydroxy-4-pregnen-3-one 3-alkylene ketal 21-acylate, respectively. The 21-acylates thus obtained can be hydrolyzed to the 21-free alcohols in accordance with the procedure disclosed above for hydrolyzing the compounds of Formula XVI.

The compounds of Formulae XVI, XVII and XVIII can be hydrolyzed by known methods for selectively hydrolyzing cyclic ketal groups, e.g., using dilute sulfuric acid as disclosed in U.S. Patents 2,707,184 and 2,758,993 to give the corresponding 3-keto compounds of Formulae VII, XIX and XIV, respectively, i.e., 18,20β-epoxy-4-pregnene-3,11-dione, 11β-hydroxy-18,20β-epoxy-4-pregnen-3-one, 11β,18;18,20β-diepoxy-4-pregnen-3-one, the corresponding 21-hydroxy compounds and the 21-acylates thereof.

The compounds of Formulae VII, XIV and XIX are dehydrogenated at the 1,2-position by fermentative or chemical dehydrogenation to give the corresponding 1-dehydro compounds. Fermentative dehydrogenation comprises the use of microorganisms such as Septomyxa, Corynebacterium, Fusarium, and the like, under fermentation conditions well known in the art, e.g., as disclosed in U.S. Patents 2,902,410 and 2,902,411. Where Septomyxa is used to effect the dehydrogenation it is found to be advantageous to use with the substrate and medium a steroid promoter, such as progesterone, 3-ketobisnor-4-cholen-22-al, 3-ketobisnorcholenic acid, 11β,21-dihydroxy-1,4,17(20)-pregnatrien-3-one, and the like. When the starting material is a 21-oxygenated compound, the free alcohols are usually employed for the fermentative dehydrogenation process. However, 21-acylates of Formulae VII, XIV, and XIX can be used. In these cases the 21-ester group is generally saponified during the fermentation process giving the corresponding 1-dehydro-21-free alcohol. Chemical dehydrogenation of the compounds of Formulae VII, XIV and XIX can be carried out with selenium dioxide according to procedures well known in the art, e.g., as disclosed in Meystre et al., Helv. Chim. Acta, 39 734 (1956). When the starting material is a 21-oxygenated compound the acylates are generally preferred as starting materials in the chemical dehydrogenation reaction giving the corresponding 1-dehydro-21-acylate.

Illustrative of the 1-dehydro compounds thus produced are 18,20β-epoxy-1,4-pregnadiene-3,11-dione, 11β-hydroxy-18,20β-epoxy-1,4-pregnadien-3-one, 11β,18;18,20β-diepoxy-1,4-pregnadien-3-one, the corresponding 21-hydroxy compounds and the 21 acylates thereof.

The 21-acylates of Formulae VII, XIV and XIX and the corresponding 1-dehydro compounds can be hydrolyzed to the corresponding 21-free alcohols by methods disclosed above for hydrolyzing the compounds of Formula XVI.

The 21-free alcohols of Formulae VII, XIV and XIX and the corresponding 1-dehydro compounds are re-esterified to the corresponding 21-acylates by reaction with the selected acylating agent. This reaction can be performed under esterification conditions known in the art, e.g., by the reaction with the selected acid chloride or acid bromide or the anhydride of an organic carboxylic acid, or by reaction with the selected acid in the presence of an esterification catalyst, for example, p-toluenesulfonyl chloride, trifluoroacetic anhydride, p-toluenesulfonic acid, trifluoroacetic acid, sulfuric acid, and the like, or with an ester under ester exchange reaction conditions. Compounds thus produced include those wherein the acyl radical is that of a hydrocarbon carboxylic acid containing from 1 to 12 carbon atoms, inclusive, e.g., the acids listed in Example 3.

Moreover, the 20α-hydroxy compounds otherwise corresponding to the 20β-hydroxy starting materials hereinabove described can be substituted as the starting materials of this invention. There are thus produced the corresponding 18,20α-epoxy and 11β,18;18,20α-diepoxy compounds which otherwise correspond to the 18,20β-epoxy and 11β,18;18,20β-diepoxy compounds described in this application. These 18,20α-epoxy and 11β,18;18,20α-diepoxy compounds have the same physiological activities as given hereinabove for the corresponding 20β-epimers and are especially useful as antihypertensive agents.

The following preparations and examples are illustrative of the products and process of this invention.

*Preparation 1.—3α,20β-dihydroxy-5β-pregnan-11-one 3-acetate (I)*

To a mixture of 45.0 g. of 3α-hydroxy-5β-pregnane-11,20-dione 3-acetate, 600 ml. of tetrahydrofuran and 3 liters of isopropyl alcohol was added 6.0 g. of sodium borohydride and 60 ml. of water. The reaction mixture was stirred at room temperature (about 25° C.) until the reaction was complete (about 3.5 hours). At the end of the reaction period the excess sodium borohydride was destroyed by the cautious addition of 25 ml. of acetic acid. The reaction mixture was then filtered and the filtrate concentrated in vacuo to a slurry. The slurry was dissolved in about 500 ml. of methylene chloride and filtered. One liter of methanol was added to the filtrate and the solution was boiled until crystallization occurred. The mixture was then cooled and the crystalline product thus obtained was collected by filtration and dried to give 22.9 g. of 3α,20β-dihydroxy-5β-pregnan-11-one 3-acetate (I) melting at 195–199° C.

In the same manner substituting as starting material in Preparation 1 3β-hydroxy-5α-pregnane-11,20-dione 3-acetate, 3β,21-dihydroxy-5α-pregnane-11,20-dione 3,21-diacetate, 3α,11β-dihydroxy-5β-pregnane-20-one 3-acetate, 3β,11β-dihydroxy-5α-pregnan-20-one 3-acetate, 3α,11β,21-trihydroxy-5β-pregnan-20-one 3,21-diacetate, 3β,11β,21-trihydroxy-5α-pregnan-20-one 3,21-diacetate, 4-pregnene-3,11,20-trione 3-ethylene ketal, 21-hydroxy-4-pregnene-3,11,20-trione 3-ethylene ketal 21-acetate, 11β-hydroxy-4-pregnene-3,20-dione 3-ethylene ketal or 11β,21-dihydroxy-4-pregnene-3,20-dione 3-ethylene ketal 21-acetate in place of 3α-hydroxy-5β-pregnane-11,20-dione 3-acetate is productive of 3β,20β-dihydroxy-5α-pregnan-11-one 3-acetate (I), 3α,20β,21 - trihydroxy - 5β-pregnan-11-one 3,21-diacetate (I), 3β,20β,21-trihydroxy-5α-pragnan-11-one 3,21-diacetate (I), 3α,11β,20β-trihydroxy-5β-pregnane 3-acetate, 3β,11β,20β-trihydroxy-5α-pregnane 3-acetate, 3α,11β,20β,21-tetrahydroxy-5β-pregnane 3,21-diacetate, 3β,11β,20β,21 - tetrahydroxy-5α-pregnane-3,21-diacetate, 20β-hydroxy-4-pregnene-3,11-dione 3-ethylene ketal (XV), 20β,21-dihydroxy-4-pregnene-3,11-dione 3-ethylene ketal 21-acetate (XV), 11β,20β-dihydroxy-4-pregnen-3-one 3-ethylene ketal and 11β, 20β,21-trihydroxy-4-pregnen-3-one 3-ethylene ketal 21-acetate, respectively.

The 20α-hydroxy compounds corresponding otherwise to the 20β-hydroxy compounds prepared and listed above can be recovered from the mother liquors by chromatography on silica gel or Florisil. After gradient elution with solvents of increasing polarity (for example, acetone in Skellysolve B) those fractions which by infrared red spectroscopy, mobility on paper chromatography or thin layer chromatography contain the desired isomer are combined and purified by crystallization, zone melting or sublimation.

When the 3-ethylene ketals are used as the starting materials in Preparation 1, above, the excess acetic acid is neutralized with aqueous saturated sodium bicarbonate solution before filtering and evaporating the solvent to prevent hydrolysis of the ketal group.

EXAMPLE 1.—3α-HYDROXY-18,20β-EPOXY-5β-PREGNAN-11-ONE 3-ACETATE (II)

A mixture of 1.00 g. of 3α,20β-dihydroxy-5β-pregnan-11-one 3-acetate (I) and 60 ml. of benzene was heated at reflux. The distillate was collected until it became clear (about 5 ml.) and then 2.00 g. of dry lead tetraacetate was added and the mixture was allowed to reflux overnight (about 18 hours). The mixture was then cooled to about 25° C., diluted with 100 ml. of water and treated with saturated potassium iodide solution until no more color change occurred. The mixture was then treated with solid sodium thiosulfate until the mixture became clear. The organic layer was separated, the solvent removed by evaporation in vacuo and the residue chromatographed over 100 g. of Florisil synthetic magnesium silicate. Elution with 3% acetone in Skellysolve B hexanes gave 0.354 g. of crude 3α-hydroxy-18,20β-epoxy-5β-pregnane-11-one 3-acetate which on recrystallization from Skellysolve B hexanes gave 0.13 g. of 3α-hydroxy-18,20β-epoxy-5β-pregnan-11-one 3-acetate (II) melting at 166–168°C.

Analysis.—Calcd. for $C_{23}H_{34}O_4$: C, 73.76; H, 9.15. Found: C, 73.66; H, 9.15.

In the same manner substituting 3α,20α-dihydroxy-5β-pregnan-11-one 3-acetate (I) as the starting steroid is productive of 3α-hydroxy-18,20α-epoxy-5β-pregnan-11-one-3-acetate (II).

In the same manner substituting as the starting steroid in Example 1, other compounds represented by Formula I, e.g., 3β,20β-dihydroxy-5α-pregnan-11-one 3 acetate, 3α,20β,21-trihydroxy-5β-pregnan-11-one 3,21-diacetate or 3β,20β,21 - trihydroxy - 5α-pregnan-11-one 3,21-diacetate and the corresponding 20α-epimers thereof, there are thus produced as products of Example 1 the corresponding 18,20β-epoxides represented by Formula II, e.g., 3β-hydroxy-18,20β-epoxy-5α-pregnan-11-one 3-acetate, 3α,21-dihydroxy-18,20β-epoxy-5β-pregnan-11-one 3,21-diacetate and 3β,21 - dihydroxy - 18,20β - epoxy-5α-pregnan-11-one 3,21-diacetate, respectively, and the corresponding 20α epimers thereof, as light colored crystalline solids.

EXAMPLE 2.—3α-HYDROXY-18,20β-EPOXY-5β-PREGNAN-11-ONE (III)

A mixture of 26.6 g. of 3α,20β-dihydroxy-5β-pregnan-11-one 3-acetate (I) and 1 liter of benzene was distilled until 100 ml. of benzene was removed. Lead tetraacetate (50 g.) was then added and the mixture was heated overnight at reflux. The reaction mixture was then cooled and 500 ml. of water and 10 g. of sodium iodide was added. Sodium thiosulfate (80 g.) was added and the mixture was shaken until it became colorless. The organic layer was separated and the solvent removed in vacuo. The residue, containing 3α-hydroxy-18,20β-epoxy-5β-pregnan-11-one 3-acetate (II), was dissolved in 500 ml. of methanol and 20 g. of potassium hydroxide was added and the mixture was refluxed under nitrogen for 2 hours. The mixture was cooled and neutralized with dilute aqueous hydrochloric acid. The solvent was then removed in vacuo and the residue thus obtained was partitioned with methylene chloride and water. The organic layer was separated and the solvent removed. The crude 3α-hydroxy-18,20β-epoxy,5β-pregnan-11 one thus obtained was dissolved in methylene chloride and chromatographed over synthetic magnesium silicate. Elution with 12% acetone in Skellysolve B hexanes gave 9.36 g. of 3α-hydroxy-18,20β-epoxy-5β-pregnan-11-one which on recrystallization from ether gave 5.25 g. of 3α-hydroxy-18,20β-epoxy-5β-pregnan-11-one (III) melting at 151-153°C. The mother liquors were concentrated and crystallized to give 1.46 g. of a second crop of 3α-hydroxy-18,20β-epoxy-5β-pregnan-11-one (III) melting at 148–151° C.

In the same manner substituting 3α-hydroxy-18,20α-epoxy-5β-pregnan-11-one 3-acetate (I) as the starting steroid, is productive of 3α-hydroxy-18,20α-epoxy-5β-pregnan-11-one (III)

In the same manner substituting as the starting steroid in Example 2 other compounds represented by Formula I, prepared and listed in the second paragraph of Example 1, there are thus produced the other corresponding free hydroxy compounds represented by Formula III, i.e., 3β-hydroxy - 18,20β - epoxy - 5α-pregnan-11-one, 3α,21-dihydroxy-18,20β-epoxy-5β-pregnan-11-one and 3β,21-dihydroxy-18,20β-epoxy-5α-pregnan-11-one, respectively, and the corresponding 20α-epimers thereof, e.g., 3α,21-dihydroxy-18,20α-epoxy-5β-pregnan-11-one, as light colored crystalline solids.

EXAMPLE 3.—3α-HYDROXY-18,20β-EPOXY-5β-PREGNAN-11-ONE 3-ACETATE (II)

A solution of 1.0 g. of 3α-hydroxy-18,20β-epoxy-5β-pregnan-11-one (III) in dry pyridine is treated with an excess of acetic anhydride and allowed to stand at room temperature until the reaction is complete (about 24 hours). The mixture is then poured into about 250 ml. of water and stirred at room temperature for about 2 hours. The crystalline product thus obtained is recovered by filtration, washed with water and dried to give 3α-hydroxy-18,20β-epoxy-5β-pregnan-11-one 3-acetate (II), a light colored crystalline solid identical to the product obtained in Example 1.

In the same manner substituting 3α-hydroxy-18,20α-epoxy-5β-pregnan-11-one (III) as the starting steroid is productive of 3α-hydroxy-18,20α-epoxy-5β-pregnan-11-one 3-acetate (II).

In the same manner substituting as starting material other free 3-hydroxy compounds or other free 3,21-dihydroxy compounds represented by Formula II, prepared and listed in the second paragraph of Example 2, above, in the procedure of Example 3 is productive of the corresponding acetate or diacetate, i.e., 3β-hydroxy-18,20β-epoxy-5α-pregnan-11-one 3-acetate, 3α,21-dihydroxy-18,20β-epoxy-5β-pregnan-11-one 3,21-diacetate and 3β,21-dihydroxy-18,20β-epoxy-5α-pregnan-11-one 3,21-diacetate, respectively, and the corresponding 20α-epimers thereof.

The 3-free hydroxy and 3,21-free dihydroxy compounds represented by Formula III, i.e., 3α-hydroxy-18,20β-epoxy-5β-pregnan-11-one, 3β-hydroxy-18,20β-epoxy-5α-pregnan-11-one, 3α,21-dihydroxy-18,20β-epoxy-5β-pregnan-11-one and 3β,21-dihydroxy-18,20β-epoxy-5α-pregnan-11-one, and the corresponding 20α-epimers thereof, are converted to other 3-esters and 3,21-diesters by reaction with the appropriate acid anhydride, acid chloride or bromide, ester by ester exchange, acid in the presence of an esterification catalyst, etc., to produce the corresponding 3-acylates and 3,21-diacylates which include those wherein the acyl radical of the acylate group is the acyl radical of, for example, an aliphatic acid, e.g., acetic, propionic, butyric, valeric, hexanoic, lauric, trimethylacetic, isobutyric, isovaleric, tertiary butylacetic, a cycloaliphatic acid, e.g., β-cyclopentylpropionic, cyclohexanecarboxylic, cyclohexylacetic, an alkaryl acid, e.g., benzoic, phenylacetic, β-phenylpropionic, o-, m-, and p-toluic, a saturated dibasic acid (which can be converted into water soluble, e.g., sodium salts), e.g., succinic, adipic, a monobasic unsaturated acid, e.g., acrylic, crotonic, undecylenic, propiolic, 2-butynoic, undecolic, cinnamic, dibasic unsaturated acids (which can be converted into water soluble, e.g., sodium, salts) e.g., maleic and citraconic, other organic substituted acids, e.g., lactic, mandelic, salicylic, trifluoroacetic, chloroacetic, α- and β-bromopropionic, iodobenzoic, thioglycollic, α-aminopropionic, benzensulfonic, toluenesulfonic, 2-furoic and the like, to give the corresponding 3α-hydroxy-18,20β-epoxy-5β-pregnan-11-one 3-acylate, 3β-hydroxy-18,20β-epoxy-5α-pregnan-1-one 3-acylate, 3α,21-dihydroxy-18,20β-epoxy-5β-pregnan-11-one 3,21-diacylate and 3β,21-dihydroxy-18,20β-epoxy-5α-pregnan-11-one 3,21-diacylate, respectively, and the corresponding 20α-epimers thereof.

EXAMPLE 4.—18,20β-EPOXY-5β-PREGNANE-3,11-DIONE (IV)

To a solution of 2.7 g. of 3α-hydroxy-18,20β-epoxy-5β-pregnan-11-one (III) in 50 ml. of acetic acid was added 2.7 g. of sodium dichromate and the mixture was stirred at room temperature (about 25°C.) for one hour. The mixture was then poured into 300 ml. of water with stirring. The product was collected on a filter and washed well with water. The product thus obtained was recrystallized from Skellysolve B hexanes to give 1.9 g. of 18,20β-epoxy-5β-pregnane-3,11-dione (IV), a light colored crystalline solid melting at 175–177° C., [α]$_D$ −56° (chloroform).

Analysis—Calcd. for $C_{21}H_{30}O_3$: C, 76.32; H, 9.15. Found: C, 76.20; H, 9.24.

In the same manner substituting 3β-hydroxy-18,20β-epoxy-5α-pregnan-11-one (III) for 3α-hydroxy-18,20β-epoxy-5β-pregnan-11-one in Example 4, is productive of 18,20β-epoxy-5α-pregnane-3,11-dione (IV), a light colored crystalline solid.

EXAMPLE 5.—18,20β-EPOXY-21-HYDROXY-5β-PREGNANE-3,11-DIONE (IV)

To a mixture of 1 g. of 3α,21-dihydroxy-18,20β-epoxy-5β-pregnan-11-one (III) in 40 ml. of toluene is added 20 ml. of cyclohexanone and a suspension of 1.0 g. of aluminum isopropoxide in 20 ml. of toluene and the mixture is heated under reflux until the reaction is complete. Most of the volatile material is then removed by steam distillation. The residue thus obtained is extracted with ethyl acetate and the combined extracts are washed with aqueous sodium bicarbonate solution, and water and dried over sodium sulfate. The solvent is then removed by evaporation and the residue thus obtained is purified by chromatography and crystallization to give 18,20β-epoxy-21-hydroxy-5β-pregnan-3,11-dione (IV), a light colored crystalline solid.

In the same manner substituting 3β,21-dihydroxy-18,20β-epoxy-5α-pregnan-11-one (III) for 3α,21-dihydroxy-18,20β-epoxy-5β-pregnan-11-one as the starting material in Example 5, is productive of 18,20β-epoxy-21-hydroxy-5α-pregnane-3,11-dione (IV), a light colored crystalline solid.

EXAMPLE 6.—11β-HYDROXY-18,20β-EPOXY-5β-PREGNAN-3-ONE (VI)

A mixture of 2.0 g. of 18,20β-epoxy-5β-pregnane-3,11-dione (IV), 0.08 g. of p-toluenesulfonic acid monohydrate, 10 ml. of ethylene glycol and 100 ml. of dry benzene is heated under reflux with concomitant removal of the water of reaction for a period of about 3.5 hours. The mixture is then cooled, washed to neutrality with aqueous sodium bicarbonate, dried and then evaporated to dryness to leave a residue containing 18,20β-epoxy-5β-pregnan-3-one 3-ethylene ketal, a crystalline solid.

A mixture of this residue, 200 ml. of absolute ether and 2.0 g. of lithium aluminum hydride is prepared and allowed to stir for about 72 hours. The excess hydride is then decomposed by the addition of ethyl acetate and water. The mixture is filtered and the solvent removed from the filtrate to give 11β-hydroxy-18,20β-epoxy-5β-pregnan-3-one 3-ethylene ketal, as a light colored crystalline solid.

To a solution of the 11β-hydroxy-18,20β-epoxy-5β-pregnan-3-one 3-ethylene ketal, thus obtained, in acetone containing 10% by volume of water is added 2.0 ml. of 25% sulfuric acid; the solution is allowed to stand at room temperature until hydrolysis is complete. At the end of the reaction excess sodium bicarbonate solution is added and the acetone is removed in vacuo at room temperature until crystallization commences. An additional 50 ml. of water is then added and the crystallization is allowed to proceed at 0°C. The solid material thus obtained is collected by filtration, washed with water and dried in vacuo to give 11β-hydroxy-18,20β-epoxy-5β-pregnan-3-one (VI), a light colored crystalline solid. The product can be further purified by recrystallization from acetone: Skellysolve B hexanes.

In the same manner substituting as the starting material in Example 6 other compounds represented by Formula IV, i.e., 18,20β-epoxy-5α-pregnane-3,11-dione, 18,20β-epoxy-21-hydroxy-5β-pregnane-3,11-dione or 18,20β-epoxy-21-hydroxy-5α-pregnane-3,11-dione, there is thus produced the corresponding 11β-hydroxy compound i.e., 11β-hydroxy-18,20β-epoxy-5α-pregnane-3-one, 11β,21-dihydroxy-18,20β-epoxy-5β-pregnan-3-one and 11β,21-dihydroxy-18,20β-epoxy-5α-pregnan-3-one, respectively.

EXAMPLE 7.—18,20β-EPOXY-21-HYDROXY-5β-PREGNANE-3,11-DIONE 21-ACETATE (V)

A solution of 3.0 g. of 18,20β-epoxy-21-hydroxy-5β-pregnane-3,11-dione (IV) in 20 ml. of dry pyridine is treated with 20 ml. of acetic anhydride and allowed to stand at room temperature until the reaction is complete (about 24 hours). The mixture is then poured into about 250 ml. of water and stirred at room temperature for about 2 hours. The crystalline product thus obtained is recovered by filtration, washed with water and dried to give 18,20β-epoxy-21-hydroxy-5β-pregnane-3,11-dione 21-acetate which on crystallization from acetone: Skellysolve B hexanes gives 18,20β-epoxy-21-hydroxy-5β-pregnane-3,11-dione 21-acetate, a light colored crystalline solid.

In the same manner substituting as the starting material in Example 7 the other 21-hydroxy compounds represented by Formulae IV and VI, i.e., 18,20β-epoxy-21-hydroxy-5α-pregnane-3,11-dione, 18,20β-epoxy-11β,21-dihydroxy-5β-pregnan-3-one or 18,20β-epoxy-11β,21-dihydroxy-5α-pregnan-3-one, there are thus produced the corresponding 21-acetates represented by Formulae V and VI.

The 21-free hydroxy compounds of Formulae IV and VI, named above, are converted to other 21-esters by esterification of the 21-hydroxy group, e.g., by reaction with the appropriate acid anhydride, acid chloride or bromide, ester by ester exchange, acid in the presence of an esterification catalyst, etc., to produce the corresponding 21-acylate of the selected starting material represented by Formulae V and VI which include those wherein the acyl radical of the 21-acylate group is the acyl radical of an acid listed in Example 3.

EXAMPLE 8.—18,20β-EPOXY-4-PREGNENE-3,11-DIONE (VII)

A mixture of 1.05 g. of 18,20β-epoxy-5β-pregnane-3,11-dione (IV), and 40 ml. of t-butanol is stirred at room temperature with 0.5 ml. of concentrated hydrochloric acid, 1.5 ml. of water and 0.5 ml. of t-butyl hypochlorite for a period of about 2.5 hours. The reaction mixture is then diluted with water and extracted with methylene chloride. The extracts are combined, washed with sodium bicarbonate solution, water, and dried over sodium sulfate. The solution is evaporated in vacuo giving 4β-chloro-18,20β-epoxy-5β-pregnane-3,11-dione. The crude 4-chloro compound is then dissolved in dimethylformamide and heated at 50–60° C. in a nitrogen atmosphere with 1.38 g. of semicarbazide hydrochloride, 1.03 g. of sodium acetate and 7 ml. of water. After a period of about 2 hours, 3.45 ml. of pyruvic acid and 3.45 ml. of water is added and the solution is maintained at the same temperature for an additional period of about 2.5 hours. The reaction mixture is then cooled and benzene and sodium bicarbonate solution are added. The organic layer is separated, washed with water and dried over sodium sulfate. The solvent is removed by evaporation in vacuo giving a residue which is dissolved in methylene chloride and chromatographed on a column of synthetic magnesium silicate. The column is eluted with increasing proportions of acetone in Skellysolve B hexanes. The crystalline material thus obtained is combined and crystallized from acetone-Skellysolve B hexanes to give 18,20β-epoxy-4-pregnene-3,11-dione (VII), a light colored crystalline solid.

In the same manner substituting as the starting steroid in Example 8, an 18,20β-epoxy-21-hydroxy-5β-pregnane-3,11-dione 21-acylate (V) prepared in Example 6, above, e.g., 18,20β-epoxy-21-hydroxy-5β-pregnane-3,11-dione 21-acetate, there is thus produced the corresponding 18,20β-epoxy-21-hydroxy-4-pregnene-3,11-dione 21-acylate (VII), e.g., 18,20β-epoxy-21-hydroxy-4-pregnene-3,11-dione 21-acetate. The corresponding 4β-chloro-18,20β-epoxy-21-hydroxy-5β-pregnan-3,11-dione 21-acylate is obtained as an intermediate in the reaction.

EXAMPLE 9.—18,20β-EPOXY-21-HYDROXY-4-PREGNENE-3,11-DIONE (VII)

To a solution of 3.25 g. of 18,20β-epoxy-21-hydroxy-4-pregnane-3,11-dione 21-acetate (VII) in methanol, previously purged of air-oxygen by passing nitrogen through it for ten minutes, is added a solution of 1.63 g. of potassium bicarbonate in 30 ml. of water, similarly purged of oxygen. The mixture is allowed to stand at room temperature until hydrolysis is complete. The reaction mixture is then neutralized with acetic acid in water and concentrated to approximately one-third volume at reduced pressure on a warm water-bath. Water is then added and the mixture is chilled. The crystalline product thus obtained is collected on a filter, washed with water and dried to give 18,20β-epoxy-21-hydroxy-4-pregnene-3,11-dione (VII), a light colored crystalline solid.

In the same manner substituting other 21-acylates of 18,20β-epoxy-21-hydroxy-4-pregnene-3,11-dione (VII) as starting material in place of the 21-acetate is likewise productive of 18,20β-epoxy-21-hydroxy-4-pregnene-3,11-dione (VII).

The 18,20β-epoxy-21-hydroxy-4-pregnene-3,11-dione (VII) can be re-esterified at the 21-position according to the procedure of Example 7, above, to give the corresponding 18,20β-epoxy-21-hydroxy-4-pregnene-3,11-dione 21-acylate wherein the acyl radical is that of an acid listed in Example 3, above.

EXAMPLE 10.—10,20β-EPOXY-5β-PREGNANE-3α,11β-DIOL-3-ACETATE (IX)

A mixture of 9.7 g. of 3α-hydroxy-18,20β-epoxy-5β-pregnan-11-one 3-acetate (II) (chromatograph fractions), 400 ml. of absolute ether and 4.0 g. of lithium aluminum hydride were combined and allowed to stir about 72 hours. The excess hydride was decomposed by the addition of 10 ml. of ethyl acetate and then 5 ml. of water. The mixture was filtered and the solvent removed from the filtrate to give 1.45 g. of 18,20β-epoxy-5β-pregnane-3α,11β-diol (VIII), as a white crystalline solid. The filtered solids were resuspended in and filtered successively from hot ethyl acetate, tetrahydrofuran, and finally pyridine. The solvents were then removed under reduced pressure to yield an additional 9.2 g. of 18,20β-epoxy-5β-pregnane-3α,11β-diol (VIII) as a light colored crystalline solid. The 18,20β-epoxy-5β-pregnane-3α,11β-diol yields were combined and suspended in 30 ml. of pyridine and 15 ml. of acetic anhydride and allowed to stir overnight. The mixture was then filtered to remove the inorganic material (1.24 g.). The filtrate was poured into dilute hydrochloric acid and extracted with methylene chloride. The extract was washed with saturated sodium bicarbonate solution and the solvent removed by evaporation at reduced pressure. The residue thus obtained was recrystallized from absolute ether to yield 3.42 g. of 18,20β-epoxy-5β-pregnane-3α,11β-diol 3-acetate (IX) melting at 169–172° C.

*Analysis.*—Calcd. for $C_{23}H_{36}O_4$: C, 73.36; H, 9.64. Found: C, 73.36; H, 9.90.

In the same manner susbtituting 3α-hydroxy-18,20α-epoxy-5β-pregnan-11-one 3-acetate (II) as the starting steroid is productive of 18,20α-epoxy-5β-pregnane-3α,11β-diol 3-acetate (IX).

In the same manner substituting as the starting steroid in Example 10 other compounds represented by Formula II for example, the 21-acetates prepared and listed in the second paragraph of Example 2, i.e., 3β-hydroxy-18,20β-epoxy-5α-pregnan-11-one 3-acetate, 3α,21-dihydroxy-18,20β-epoxy-5β-pregnan-11-one 3,21-diacetate and 3β,21-dihydroxy-18,20β-epoxy-5α-pregnan-11-one 3,21-diacetate and the corresponding 20α-epimers thereof, e.g., 3α,21-dihydroxy-18,20α-epoxy-5β-pregnan-11-one 3,21-diacetate, there is thus produced the corresponding 11β-hydroxy compound represented by Formula IX, i.e., 18,20β-epoxy-5α-pregnane-3β,11β-diol-3-acetate, 18,20β-epoxy-5β-pregnane-3α,11β,21-triol 3,21-diacetate and 18,20β-epoxy-5α-pregnane-3β,11β,21-triol 3,21-diacetate, respectively, and the corresponding 20α-epimers thereof, e.g., 18,20α-epoxy-5β-pregnane-3α,11β,21-triol 3,21-diacetate, the corresponding free hydroxy compounds of Formula VIII are likewise produced as intermediates in the reaction.

In the same manner other acylates represented by Formula II, prepared and named in Example 3, or the corresponding free hydroxy compounds represented by Formula III, prepared and named in Example 2, can be substituted as starting material in place of the acetate in the procedure of Example 10 to produce the same corresponding 11β-hydroxy compounds, i.e., 18,20β-epoxy-5β-pregnane-3α,11β-diol 3-acetate, 18,20β-epoxy-5α-pregnane-3β,11β-diol 3-acetate, 18,20β-epoxy-5β-pregnane-3α,11β,21-triol 3,21-diacetate and 18,20β-epoxy-5α-pregnane-3β,11β,21-triol 3,21-diacetate, and the corresponding 20α-epimers thereof.

In the same manner other acid anhydrides of hydrocarbon carboxylic acids, for example those acids listed in Example 3 can be substituted in place of acetic anhydride in the procedure of Example 10 to produce the corresponding 3-acylates and 3,21-diacylates (IX), i.e., 18,20β-epoxy-5β-pregnane-3α,11β-diol 3-acylate, 18,20β-epoxy-5α-pregnane-3β,11β-diol 3-acylate, 18,20β-epoxy-5β-pregnane-3α,11β,21-triol 3,21-diacylate and 18,20β-epoxy-5α-pregnane-3β,11β,21-triol 3,21-diacylate and the corresponding 20α-epimers thereof.

The 3-acetates, 3,21-diacetates or other corresponding 3-acylates and 3,21-diacylates thus prepared can be hydrolyzed in accordance with the hydrolysis procedure of Example 2 above, e.g., with sodium hydroxide in methanol to give the corresponding free hydroxy compounds, i.e., 18,20β-epoxy-5β-pregnane-3α,11β-diol, 18,20β-epoxy-5α-pregnane-3β,11β-diol, 18,20β-epoxy-5β-pregnane-3α,11β,21-triol and 18,20β-epoxy-5α-pregnane-3β,11β,21-triol and the corresponding 20α-epimers thereof.

EXAMPLE 11.—11β,18;18,20β-DIEPOXY-5β-PREGNAN 3α-OL 3-ACETATE (X)

A mixture of 3.5 g. of 18,20β-epoxy-5β-pregnane-3α,11β-diol 3-acetate (IX) and 350 ml. of benzene was distilled until about 50 ml. of distillate was removed, 7.0 g. of lead tetraacetate was then added and the mixture was refluxed for about 18 hours. The mixture was then cooled and 100 ml. of water and 1.0 g. of sodium iodide was added. Then 20.0 g. of sodium thiosulfate was added and the mixture shaken until the iodine color disappeared. The organic layer was separated and washed with saturated aqueous sodium bicarbonate. The solvent was removed in vacuo to give 3.43 g. of a crystalline residue containing 11β,18;18,20β-diepoxy-5β-pregnan-3α-ol 3-acetate. The product thus obtained was dissolved in methylene chloride and chromatographed over a column of synthetic magnesium silicate. The column was eluted with Skellysolve B hexanes containing increasing proportions of acetone. The fraction eluted with 3% acetone in Skellysolve B hexanes gave 1.981 g. of 11β,18;18,20β-diepoxy-5β-pregnan-3α-ol 3-acetate (X), which can be further purified by recrystallization from acetone-Skellysolve B hexanes.

In the same manner substituting 18,20α-epoxy-5β-pregnane-3α,11β-diol 3-acetate (IX) as the starting steroid is productive of 11β,18;18,20α-diepoxy-5β-pregnane-3α-ol 3-acetate (X).

In the same manner substituting as the starting steroid in Example 11 other acetates represented by Formula II prepared and listed in the second paragraph of Example 10, there is thus produced the corresponding diepoxy compounds represented by Formula X, i.e., 11β,18;18,20β-diepoxy-5α-pregnane-3β-ol 3-acetate, 11β,18;18,20β-diepoxy-3β-pregnane-3α,21-diol, 3,21-diacetate and 11β,18;18,20β-diepoxy-5α-pregnane-3β,21-diol 3,21-diacetate, respectively, and the corresponding 20 -epimers thereof, e.g., 11β,18;18,20α-diepoxy-5β-pregnane-3α,21-diol 3,21-diacetate.

In the same manner substituting as starting material in Example 11 other acylates in place of the acetates there are thus produced the corresponding diepoxy compounds of Formula X, i.e., 11β,18;18,20β-diepoxy-5β-pregnane-3α-ol 3-acylate, 11β,18;18,20β-diepoxy-5α-pregnane-3β-ol 3-acylate, 11β,18;18,20β-diepoxy-5β-pregnane-3α,21-dial 3,21-diacylate and 11β,18;18,20β-diepoxy-5α-pregnane-3β,21-diol 3,21-diacylate and the corresponding 20α-epimers thereof, wherein the acyl radical is that of an acid listed in the third paragraph of Example 3.

EXAMPLE 12.—11β,18;18,20β-DIEPOXY-5β-PREGNANE-3α-OL 3-ACETATE (X)

A mixture of 1.00 g. of 3α,11β,20β-trihydroxy-5β-pregnane 3-acetate and 60 ml. of benzene is heated at reflux. The distillate is collected until it becomes clear (about 5 ml.) and then 4.0 g. of dry lead tetraacetate is added and the mixture is allowed to reflux about 18 hours. The mixture is then cooled to about 25° C., diluted with about 100 ml. of water and treated with saturated potassium iodide solution until no more color change occurs. The mixture is then treated with solid sodium thiosulfate until the mixture becomes clear. The organic layer is separated, the solvent removed in vacuo and the residue chromatographed over 100 g. of synthetic manesium silicate. Elution with 3% acetone in Skellysolve B hexanes gives crude 11β,18;18,20β-diepoxy-5β-pregnane-3α-ol 3-acetate which on recrystallization from Skellysolve B hexanes gives 11β,18;18,20β - diepoxy - 5β-pregnan-3α-ol 3-acetate (X), a light colored crystalline solid.

In the same manner substituting 3α,11β,20α-trihydroxy-5β-pregnane 3-acetate as the starting steroid is productive of 11β,18;18,20α-diepoxy-5β-pregnan-3α-ol 3-acetate (X).

In the same manner, substituting as the starting steroid in Example 12, 3β,11β,20β-trihydroxy-5α-pregnane 3-acetate, 3α,11β,20β,21-tetrahydroxy-5β-pregnane 3,21-diacetate, 3β,11β,20β,21-tetrahydroxy-5α-pregnane 3,21-diacetate or the corresponding 20α-epimers thereof is productive of 11β,18;18,20β-diepoxy-5α-pregnan-3β-ol 3-acetate, 11β,18;18,20β - diepoxy-5β-pregnane-3α,21-diol 3,21-diacetate and 11β,18;18,20β-diepoxy-5α-pregnane-3β,21-diol 3,21-diacetate, respectively, and the corresponding 20α-epimers thereof, e.g., 11β,18;18,20α - diepoxy-5β-pregnane-3α,21-diol 3,21-diacetate.

EXAMPLE 13.—11β,18;18.20β-DIEPOXY-5β-PREGNAN-3α-OL (XI)

A solution of 2.0 g. of 11β,18;18,20β-diepoxy-5β-pregnan-3α-ol 3-acetate (X) in 100 ml. of methanol was treated with 0.56 g. of potassium hydroxide under nitrogen. After stirring for 16 hours, the base was neutralized by the addition of 0.65 ml. of acetic acid. The solvent was evaporated in vacuo and the residue thus obtained was recrystallized from absolute ether to give 1.34 g. of 11β,18;18,20β-diepoxy-5β-pregnan-3α-ol (XI) melting at 181–184° C.

In the same manner substituting for the 11β,18;18,20α-diepoxy-5β-pregnan-3α-ol 3-acetate (X) as the starting steriod is productive of 11β,18;18,20α-diepoxy-5β-pregnan-3α-ol (XI).

In the same manner substituting as the starting steroid in Example 13 other acetates represented by Formula X, prepared and listed in the second paragraph of Example 12, there is thus produced the corresponding free hydroxy compounds represented by Formula XI, i.e., 11β,18;18,20β-diepoxy-5α-pregnan-3β-ol, 11β,18;18,20β-diepoxy-5β-pregnane - 3α,21-diol and 11β,18;18,20β-diepoxy-5α-pregnane-3β,21-diol, respectively, and the corresponding 20α-epimers thereof, e.g., 11β,18;18,20α-diepoxy-5β-pregnane-3α,21-diol.

In the same manner other acylates can be substituted for the acetates to produce the same free hydroxy compounds.

The free hydroxy compounds thus obtained can be reesterified in accordance with the procedure of Example 3 to produce the corresponding acyloxy compounds of Formula X wherein the acyl radical is that of an acid listed in Example 3.

EXAMPLE 14.—11β,18;18,20β-DIEPOXY-5β-PREGNAN-3-ONE (XII)

A solution of 1.60 g. of 11β,18;18,20β-diepoxy-5β-pregnan-3α-ol (XI) in about 20 ml. of acetic acid was treated with 1.60 g. of sodium dichromate dihydrate. The mixture was then stirred for a period of about one hour at room temperature (about 25° C.) and then poured into 150 ml. of water. The crystalline product thus obtained was collected on a filter, washed well with water and dried to give 1.43 g. of crude 11β,18;18,20β-diepoxy-5β-pregnan-3-one. The crude product was recrystallized from methanol to give 11β,18;18,20β-diepoxy-5β-pregnan-3-one (XII) melting at 179–183° C.

Analysis—Calcd. for $C_{21}H_{30}O_3$: C, 76.32; H, 9.15. Found: C, 75.93; H, 9.21.

In the same manner substituting 11β,18;18,20α-diepoxy-5β-pregnan-3-ol (XI) as starting steroid is productive of 11β,18;18,20α-diepoxy-5β-pregnan-3-one (XII).

In the same manner substituting 11β,18;18,20β-diepoxy-5α-pregnan-3β-ol (XI) or the corresponding 20α-epimer thereof as the starting steroid in Example 14 is productive of 11β,18;18,20β-diepoxy-5α-pregnan-3-one (XII) and the corresponding 20α-epimer thereof, respectively, as light colored crystalline solids.

EXAMPLE 15.—11β,18;18,20β-DIEPOXY-21-HYDROXY-5β-PREGNAN-3-ONE (XII)

To a mixture of 1.0 g. of 11β,18;18,20β-diepoxy-5β-pregnane-3α,21-diol (XI) and 40 ml. of toluene is added 20 ml. of cyclohexanone and a suspension of 1.0 g. of aluminum isopropoxide in 20 ml. of toluene and the mixture is heated under reflux until the reaction is complete. Most of the volatile material is then removed by steam distillation. The residue thus obtained is extracted with ethyl acetate and the combined extracts are washed with aqueous sodium bicarbonate solution and water and dried over sodium sulfate. The solvent is then removed by evaporation and the residue thus obtained is purified by chromatography and crystallization to give 11β,18;18,20β-diepoxy-21-hydroxy 5β-pregnan-3-one (XII), a light colored crystalline solid.

In the same manner substituting 11β,18;18,20α-diepoxy-5β-pregnane-3α,21-diol (XI) as starting material is productive of 11β,18;18,20α-diepoxy-21-hydroxy-5β-pregnan-3-one (XII).

In the same manner substituting 11β,18;18,20β-diepoxy-5α-pregnane-3β,21-diol (XI), or the corresponding 20α-epimer thereof, as the starting material in Example 15 is productive of 11β,18;18,20β-diepoxy-21-hydroxy-5α-pregnan-3-one (XII) and the corresponding 20α-epimer, respectively, as light colored crystalline solids.

EXAMPLE 16.—11β,18;18,20β - DIEPOXY-21-HYDROXY-5β-PREGNEN-3-ONE 21-ACETATE (XIII) AND 11β,18;18,20β-DIEPOXY-21-HYDROXY - 5α - PREGNAN-3-ONE 21-ACETATE (XIII)

Substituting an equivalent amount of 11β,18;18,20β-diepoxy-21-hydroxy-5β-pregnan-3-one (XII), 11β,18;18,20β-diepoxy-21-hydroxy-5α-pregnan-3-one (XII) or the corresponding 20α-epimers thereof, e.g., 11β,18;18,20α-diepoxy-21-hydroxy-5β-pregnan-3-one (XIII) as the starting steroid in Example 7, above, in place of 18,20β-epoxy-21-hydroxy-5β-pregnane-3,11-dione is productive of 11β,18;18,20β-diepoxy-21-hydroxy-5β-pregnan-3-one 21-acetate and 11β,18;18,20β-diepoxy-21-hydroxy-5α-pregnan-3-one 21-acetate, respectively, and the corresponding 20α-epimers thereof, e.g., 11β,18;18,20α-diepoxy-21-hydroxy-5β-pregnan-3-one 21-acetate.

The 21-free hydroxy compounds of Formula XII, named above, are converted to other 21-esters by esterification of the 21-hydroxy group, e.g., by reaction with the appropriate acid anhydride, acid chloride or bromide, ester by ester exchange, acid in the presence of an esterification catalyst, etc., to produce the corresponding 21-acylate of the selected starting material represented by Formula XIII which include those wherein the acyl radical of the 21-acylate group is the acyl radical of an acid listed in Example 3.

EXAMPLE 17.—11β,18;18,20β-DIEPOXY-4-PREGNEN-3-ONE (XIV)

A mixture of 1.12 g. of 11β,18;18,20β-diepoxy-5β-pregnan-3-one, 40 ml. of t-butyl alcohol, 0.5 ml. of t-butyl hypochlorite and dilute hydrochlorite acid (0.5 ml. of concentrated hydrochloric acid and 1.5 ml. of water) was stirred at room temperature (about 25° C.) for a period of about 2.5 hours giving a white precipitate. The precipitate thus obtained was collected on a filter and dried to give 0.37 g. of 4β-chloro-11β,18;18-20β-diepoxy-5β-pregnan-3-one melting at 193–196° C. with decomposition.

A mixture of the 4-chloro compound thus obtained, 8 ml. of redistilled dimethyl formamide, 0.45 g. of semicarbazide hydrochloride, 0.34 g. of sodium acetate and 2 ml. of water was heated at about 60° C. for a period of about 2 hours. Then 1.2 ml. of pyruvic acid and 1.2 ml. of water was added and heating at about 60° C. was continued for an additional period of about 2.5 hours. The reaction mixture was then poured into about 200 ml. of a mixture of ice and water with stirring and then filtered to give 0.213 g. of a crystalline white solid. The product thus obtained was dissolved in methylene chloride and chromatographed over synthetic magnesium silicate. Elution with 5% acetone in Skellysolve B hexanes gave 0.134 g. of 11β,18;18,20β-diepoxy-4-pregnen-3-one. Recrystallization from methanol gave an analytical sample of 11β,18;18,20β-diepoxy-4-pregnen-3-one (XIV) melting at 201–203° C., [α]_D +140° in chloroform.

In the same manner substituting 11β,18;18,20α-diepoxy-5β-pregnane-3-one as the starting steroid is productive of 11β,18;18,20α-diepoxy-4-pregnene-3-one (XIV).

In the same manner substituting as the starting steroid in Example 17, 11β,18;18,20β-diepoxy-21-hydroxy-5β-pregnan-3-one 21-acylate (XIII) or the corresponding 20α-epimer thereof prepared in Example 16, above, e.g., 11β,18;18,20β-diepoxy-21-hydroxy-5β-pregnan-3-one 21-acetate or 11β,18;18,20α-diepoxy-21-hydroxy-5β-pregnan-3-one 21-acetate, there is thus produced the corresponding 11β,18;18,20β-diepoxy-21-hydroxy-4-pregnen-3-one 21 - acylate (XIV) and the corresponding 20α-epimer, respectively, e.g., 11β,18;18,20β-diepoxy-21-hydroxy-4-pregnen-3-one 21-acetate and 11β,18;18,20α-diepoxy-21-hydroxy-4-pregnen-3-one 21-acetate. The corresponding 4β-chloro - 11β,18;18,20β-diepoxy-21-hydroxy-5β-pregnan-3 - one 21-acylate and the corresponding 20α-epimer thereof are obtained as intermediates in the reaction.

EXAMPLE 18.—11β,18;18,20β-DIEPOXY-21-HYDROXY-4-PREGNEN-3-ONE (XIV)

Following the procedure of Example 9 but substituting an equivalent amount of 11β,18;18,20β-diepoxy-21-hydroxy-4-pregnen-3-one 21-acetate (XIV) or the corresponding 20α-epimer thereof for 18,20β-epoxy-21-hydroxy-4-pregnene-3,11-dione 21-acetate is productive of 11β,18;18,20β-diepoxy-21 - hydroxy - 4 - pregnen - 3 - one (XIV) and 11β,18;18,20α-diepoxy-21-hydroxy-4-pregnen-3-one (XIV), respectively, as light colored crystalline solids.

In the same manner substituting other 21-acylates of 11β,18;18,20β-diepoxy-21-hydroxy-4 - pregnan - 3 - one or other 21-acylates of the corresponding 20α-epimer thereof as the starting material in place of the 21-acetate is likewise productive of 11β,18;18,20β-diepoxy-21-hydroxy-4-pregnen-3-one (XIV) and the corresponding 20α-epimer thereof, respectively.

The 11β,18;18,20β-diepoxy-21-hydroxy - 4 - pregnene-3-one (XIV) and the corresponding 20α-epimer thereof can be re-esterified at the 21-position according to the procedure of Example 7, above, to give the corresponding 21-acylate wherein the acyl radical is that of an acid listed in Example 3, above.

EXAMPLE 19.—18,20β-EPOXY-4-PREGNENE-3,11-DIONE 3-ETHYLENE KETAL (XVI)

A mixture of 5.3 g. of 20β-hydroxy-4-pregnene-3,11-dione 3-ethylene ketal (XV) and 350 ml. of benzene was distilled until 50 ml. of benzene was removed; 11.5 g. of lead tetraacetate was then added and the reaction mixture was heated at reflux overnight (about 12 to 14 hours). The mixture was then cooled and 100 ml. of water and 10 g. of sodium thiosulfate was added with stirring. The mixture was filtered through celite diatomaceous earth and the celite was washed with methylene chloride. The methylene chloride was separated from the water layer, washed with aqueous sodium bicarbonate solution and evaporated to remove the solvent. The residue thus obtained was re-dissolved in methylene chloride and chromatographed on 400 g. of synthetic magnesium silicate. Elution with 5% acetone in Skellysolve B hexanes gave 1.07 g. of 18,20β-epoxy-4-pregnene-3,11-dione 3-ethylene ketal (XVI), a light colored crystalline solid. The infrared spectrum supported the assigned structure.

In the same manner substituting 20α-hydroxy-4-pregnene-3,11-dione-3-ethylene ketal (XV) as the starting steroid is productive of 18,20α-epoxy-4-pregnene-3,11-dione 3-ethylene ketal (XVI).

In the same manner substituting 20β,21-dihydroxy-4- pregnene-3,11-dione 3-ethylene ketal 21-acetate (XV) or the corresponding 20α-epimer thereof as the starting steroid in Example 19 is productive of 18,20β-epoxy-21-hydroxy-4-pregnene-3,20-dione 3-ethylene ketal 21-acetate (XVI) and the corresponding 20α-epimer thereof, respectively, which can be hydrolyzed in accordance with the procedure of Example 9 to give 18,20β-epoxy-21-hydroxy-4-pregnene-3,20-dione 3-ethylene ketal and the corresponding 20α-epimer thereof, respectively. The 21-hydroxy compounds thus produced can be re-esterified in accordance with the procedure of Example 7, above, to give the corresponding 18,20β-epoxy-21-hydroxy-4-pregnene-3,20-dione 3-ethylene ketal 21-acylate and the corresponding 20α-epimer thereof, respectively, wherein the acyl radical is that of an acid named in Example 3.

EXAMPLE 20.—18,20β-EPOXY-4-PREGNENE-3,11-DIONE (VII)

A mixture of 2.20 g. of crude 18,20β-epoxy-4-pregnene-3,11-dione ethylene ketal (XVI), 50 ml. of acetone, 10 ml. of methylene chloride, 10 ml. of methanol and 10 ml. of water containing 10 drops of sulfuric acid was stirred for 16 hours at room temperature (about 25° C.). The reaction mixture was then neutralized with saturated aqueous sodium bicarbonate solution, poured into water and extracted with methylene chloride. The solvent was removed by evaporation to give 2.17 g. of residue which was redissolved in methylene chloride and chromatographed over 200 g. of synthetic magnesium silicate. Elution with 10% acetone in Skellysolve B hexane gave 1.45 g. of 18,20β-epoxy-4-pregnene-3,11-dione. Two recrystallizations, one from acetone-Skellysolve B hexanes and one from aqueous methanol, yielded 0.74 g. of 18,20β-epoxy-4-pregnene-3,11-dione (VII) melting at 163 to 173° C.

$\gamma_{max.}^{mineral\ oil}$ 1673, 1618, 1062, 1050 cm.$^{-1}$

Analysis.—Calcd. for $C_{21}H_{28}O_3$: C, 76.79; H, 8.59. Found: C, 76.92; H, 8.62.

In the same manner substituting 18,20β-epoxy-21-hydroxy-4-pregnene-3,11-dione 3-ethylene ketal or a 21-acylate thereof (XVI) as the starting steroid in Example 20 is productive of 18,20β-epoxy-21-hydroxy-4-pregnene-3,11-dione (VII) and the corresponding 18,20β-epoxy-21-hydroxy-4-pregnene-3,11-dione 21-acylate, respectively.

EXAMPLE 21.—11β-HYDROXY-18,20β-EPOXY-4-PREGNEN-3-ONE 3-ETHYLENE KETAL (XVII) AND 11β,18;18,20β-DIEPOXY-4-PREGNEN-3-ONE 3-ETHYLENE KETAL (XVIII)

A mixture of 400 mg. of 18,20β-epoxy-4-pregnene-3,11-dione 3-ethylene ketal and 30 ml. of absolute ether was reacted with 200 mg. of lithium aluminum hydride and allowed to stir at room temperature (about 25° C.) for a period of about 2 hours. The excess hydride was decomposed by the cautious addition of ethyl acetate and then water. The mixture was then filtered through celite diatomaceous earth to remove the solid inorganic salts. The filter cake was washed with ethyl acetate and actone and the washes were combined with the filtrate. The filtrate was then evaporated to remove the solvent giving 0.57 g. of a white solid residue containing inorganic material. The residue was leached with boiling benzene and the benzene was evaporated to give 0.40 g. of 11β-hydroxy-18,20β-epoxy-4-pregnene-3-one 3-ethylene ketal, a white crystalline solid. The infrared spectrum of this material indicated that it had been completely reduced.

The 11β-hydroxy-18,20β-epoxy-4-pregnen-3-one 3-ethylene ketal thus obtained was dissolved in about 25 ml. of benzene, 2.0 g. of lead tetracetate was added and the mixture was allowed to reflux for a period of about 16 hours. At the end of the reflux period 10 ml. of water and 3.0 g. of sodium thiosulfate were added with stirring. The organic layer was separated, then washed with water and aqueous sodium bicarbonate. The solvent was removed by evaporation and the residue thus obtained was dissolved in methylene chloride and chromatographed over 30 g. of synthetic magnesium silicate. Elution with 4% acetone in Skellysolve B hexanes gave 0.050 g. of 11β,18;18,20β-diepoxy-4-pregnene-3-one 3-ethylene ketal. Recrystallization from aqueous methanol gave an analytical sample of 11β,18;18,20β-diepoxy-4-pregnene-3-one 3-ethylene ketal (XVIII) melting at 232 to 236° C., $\gamma_{max.}^{mineral\ oil}$ 1670, 1165–1002cm.$^{-1}$ Analysis.—Calcd. for $C_{23}H_{32}O_4$: C, 74.16; H, 8.66. Found: C, 74.29; H, 8.78.

Further elution with 4% acetone in Skellysolve B hexanes eluted 0.211 g. of the starting material for the lead tetraacetate reaction which was recrystallized from aqueous methanol to give 11β-hydroxy-18,20β-epoxy-4-pregnene-3-one 3-ethylene ketal (XVII) melting at 232 to 236° C.;

$\gamma_{max.}^{mineral\ oil}$ 3420, 1075, 1160–1005

Analysis.—Calcd. for $C_{23}H_{34}O_4$: C, 73.76; H, 8.15. Found: C, 73.91; H, 8.84.

In the same manner substituting 18,20α-epoxy-4-pregnene-3,11-dione 3-ethylene ketal as the starting steroid is productive of 11β-hydroxy-18,20α-epoxy-4-pregnen-3-one 3-ethylene ketal (XVII) and 11β,18;18,20α-diepoxy-4-pregnen-3-one 3-ethylene ketal (XVII).

In the same manner substituting 18,20β-epoxy-21-hydroxy-4-pregnene-3,11-dione 3-ethylene ketal (XVII) or the corresponding 20α-epimer thereof as the starting steroid in Example 21, there is thus produced as a product of the lithium aluminum hydride reaction 18,20β-epoxy-11β,21-dihydroxy-4-pregnen-3-one 3-ethylene ketal (XVII) and the corresponding 20α-epimer thereof, respectively, which are then acylated at the 21-position with acetic anhydride to give 18,20β-epoxy-11β,21-dihydroxy-4-pregnen-3-one 3-ethylene ketal 21-acetate (XVII) and the 20α-epimer thereof, respectively, which on treatment with lead tetraacetate give 11β,18;18,20β-diepoxy-21-hydroxy-4-pregnen-3-one 3-ethylene ketal 21-acetate and 11β,18;18,20α-diepoxy-21-hydroxy-4-pregnen-3-one 3-ethylene ketal 21-acetate (XVIII), respectively.

EXAMPLE 22.—11β,18;18,20β-DIEPOXY-4-PREGNEN-3-ONE 3-ETHYLENE KETAL (XVIII)

A mixture of 1.00 g. of 11β,20β-dihydroxy-4-pregnen-3-one 3-ethylene ketal and 60 ml. of benzene is heated at reflux. The distillate is collected until it becomes clear (about 5 ml.) and then 4.0 g. of dry lead tetraacetate is added and the mixture is allowed to reflux about 18 hours. The mixture is then cooled to about 25° C., diluted with about 100 ml. of water and treated with saturated potassium iodide solution until no more color change occurs. The mixture is then treated with solid sodium thiosulfate until the mixture becomes clear. The organic layer is separated, the solvent removed in vacuo and the residue chromatographed over 100 g. of synthetic magnesium silicate. Elution with acetone in Skellysolve B hexanes gives crude 11β,18;18,20β-diepoxy-4-pregnen-3-one 3-ethylene ketal which on recrystallization from acetone-Skellysolve B hexanes gives 11β,18;18,20β-diepoxy-4-pregnen-3-one 3-ethylene ketal which on recrystallization from acetone-Skellysolve B hexanes gives 11β,18;18,20β-diepoxy-4-pregnen-3-one 3-ethylene ketal (XVIII), a light colored crystalline solid.

In the same manner substituting 11β,20α-dihydroxy-4-pregnen-3-one 3-ethylene ketal as the starting steroid is productive of 11β,18;18,20α-diepoxy-4-pregnen-3-one 3-ethylene ketal (XVIII).

In the same manner substituting 11β,20β,21-trihydroxy-4-pregnen-3-one 3-ethylene ketal 21-acetate (XVIII), or the corresponding 20α-epimer thereof, as the starting steroid in Example 22 is productive of 11β,18;18,20β-diepoxy-21-hydroxy-4-pregnen-3-one 3-ethylene ketal 21-acetate (XVIII), and the corresponding 20α-epimer thereof, respectively, which can be hydrolyzed according to the procedure of Example 9, above, to give 11β,18;18,20β-diepoxy - 21 - hydroxy-4-pregnen-3-one 3-ethylene ketal (XVIII), and 11β,18;18,20α-diepoxy-21-hydroxy-4-pregnen-3-one 3-ethylene ketal (XVIII), respectively. The free 21-hydroxy compounds thus obtained can be re-esterified in accordance with the procedure of Example 7, above, to give the corresponding 11β,18;18,20β-diepoxy-21-hydroxy-4-pregnen-3-one 3-ethylene ketal 21-acylate, and the corresponding 20α-epimer thereof, wherein the acyl radical is that of an acid listed in the third paragraph of Example 3.

EXAMPLE 23.—11β,18;18,20β-DIEPOXY-4-PREGNEN-3-ONE (XIV)

A mixture of 0.110 g. of 11β,18;18,20β-diepoxy-4-pregnen-3-one 3-ethylene ketal, 15 ml. of acetone and 5 ml. of water containing 5 drops of concentrated sulfuric acid was allowed to stand overnight at room temperature (about 25° C.). The mixture was then poured into water, neutralized with saturated aqueous sodium bicarbonate solution and extracted with methylene chloride. The solvent was then removed in vacuo and the residue thus obtained was dissolved in methylene chloride and chromatographed over 20 g. of Florisil synthetic magnesium silicate. Elution with 8% acetone in Skellysolve B hexanes gave 0.061 g. of 11β,18;18,20β-diepoxy-4-pregnen-3-one (XIV); the infrared spectrum of this compound was identical to that obtained in Example 17.

In the same manner substituting 11β,18;18,20α-diepoxy-4-pregnen-3-one 3-ethylene ketal as starting material is productive of 11β,18;18,20α - diepoxy-4-pregnen-3-one (XIV).

EXAMPLE 24.—11β-HYDROXY-18,20β-DIEPOXY-4-PREGNEN-3-ONE (XIX)

Following the procedure of Example 23 but substituting an equivalent amount of 11β-hydroxy-18,20β-epoxy-4-pregnen-3-one 3-ethylene ketal (XVII) as starting material in place of 11β,18;18,20β-diepoxy-4-pregnen-3-one is productive of 11β-hydroxy-18,20β-epoxy-4-pregnen-3-one, a light colored crystalline solid.

In the same manner substituting 11β,21-dihydroxy-18,20β-epoxy-4-pregnen-3-one 3-ethylene ketal (XVII), 11β,18;18,20β-diepoxy-21-hydroxy-4-pregnen-3-one 3-ethylene ketal (XVIII) or 11β,18;18,20α-diepoxy-21-hydroxy-4-pregnen-3-one 3-ethylene ketal (XVIII), as the starting steroid in Example 22 is productive of 11β,21-dihydroxy-18,20β-epoxy-4-pregnen-3-one (XIX), 11β,18;18,20β-diepoxy-21-hydroxy-4-pregnen-3-one (XIV), and 11β,18;18,20α-diepoxy-21-hydroxy-4-pregnen-3-one (XIV), respectively. These 21-hydroxy compounds thus produced can be esterified at 21-position in accordance with the procedure of Example 7, above, to produce the corresponding 11β,21-dihydroxy-18,20β-epoxy-4-pregnen-3-one 3-acylate (XIX), 11β,18;18,20β - diepoxy-21-hydroxy-4-pregnen-3-one 21-acylate (XIV) and the corresponding 20α-epimers thereof, respectively, wherein the acyl radical is that of an acid listed in the third paragraph of Example 3.

Alternatively, the 21-acylates represented by Formulae XVII and XVIII can be substituted as the starting steroid in Example 23 to produce the corresponding deketalized 21-acylates of Formulae XIX and XIV, named in the preceding paragraph.

EXAMPLE 25.—18,20β-EPOXY-1,4-PREGNADIENE-3,11-DIONE

Five 100 ml. portions of a medium, in 250 ml. Erlenmeyer flasks, containing 1% glucose, 2% corn steep liquor (60% solids) and tap water are adjsted to a pH of 4.9. This medium is sterilized for 45 minutes at 15 p.s.i. and inoculated with a one to two day vegetative growth of *Septomyxa affinis* ATCC 6737. The Erlenmeyer flasks are shaken at room temperature (about 26 to 28° C.) for a period of about three days. At the end of this period this 500 ml. volume is used as an inoculum for 10 liters of the same glucose-corn steep liquor medium which in addition contains 5 m., of an antifoam compound (a mixture of lard oil and octadecanol). The fermentor is placed into the water-bath, adjusted to 28° C. and the contents stirred thoroughly (300 r.p.m.) and aerated (0.1 liter of air per minute to 10 liters of beer). After 20 hours of incubation, when a good growth has been developed, 1.0 g. of 18,20β-epoxy-4-pregnene-3,11-dione (VII) plus 50 mg. of 3-ketobisnor-4-cholen-22-al dissolved in dimethylformamide is added and the incubators carried out at the same temperature (28° C.) and aeration until the reaction is complete (final pH 8.3). The mycelium is filtered off and extracted with three 200 ml. portions of acetone. The beer is extracted with three 1 liter portions of methylene chloride and thereupon the acetone extracts and the extracts of beer are combined, dried over anhydrous sodium sulfate and evaporated and the resulting residue chromatographed over an anhydrous magnesium silicate column, which on elution with Skellysolve β hexanes containing increasing proportions of acetone from 1 to 50% and crystallization gives 18,20β-epoxy-1,4-pregnadiene-3,11-dione, a light colored crystalline solid.

Instead of Septomyxa, species of other genera such as Corynebacterium, Didymella, Calonectria, Alternaria, Colletotrichum, Cylindrocarpon, Ophiobolus, Fusarium, Listeria, Erysipelothrix, Mycobacterium, Tricothecium, Leptosphaeria, Curcurbitaria, Nocardia, and enzymes of fungi of the family Tuberculariaceae can be used to introduce a Δ¹-bond into 18,20β-epoxy-4-pregnene-3,11-dione using fermentation conditions known in the art.

EXAMPLE 26.—11β-HYDROXY-18,20β-EPOXY-1,4-PREGNADIENE-3-ONE

A stoichiometric equivalent amount of 18,20β-epoxy-11β-hydroxy-4-pregnen-3-one (XIX) is substituted as starting material for 18,20β-epoxy-4-pregnen-3,11-dione in the procedure of Example 25 to obtain 11β-hydroxy-18,20β-epoxy-1,4-pregnadien-3-one, a light colored crystalline solid.

EXAMPLE 27.—11β,18;18,20β-DIEPOXY-1,4-PREGNADIEN-3-ONE

A stoichiometric equivalent amount of 11β,18;18,20β-diepoxy-4-pregnen-3-one (XIV) is substituted as starting material for 18,20β-epoxy-4-pregnene-3,11-dione in the procedure of Example 25 to obtain 11β,18;18,20β-diepoxy-1,4-pregnadien-3-one, a light colored crystalline solid.

In the same manner substituting 11β,18;18,20α-diepoxy-4-pregnene-3-one as starting material is productive of 11β,18;18,20α-diepoxy-4-pregnene-3-one.

In the same manner substituting the corresponding 21-hydroxy compounds represented by Formulae VII, XIV and XIX, i.e., 18,20β-epoxy-21-hydroxy-4-pregnene-3,11-dione, 11β,21-dihydroxy-18,20β-epoxy-4-pregnen-3 - one, 11β,18;18,20β-diepoxy-21-hydroxy-4-pregnen - 3 - one, or the corresponding 20α-epimers thereof, for 18,20β-epoxy-4-pregnene-3,11-dione in the procedures of Example 25 is productive of the corresponding 1-dehydro compounds, i.e., 18,20β-epoxy-21-hydroxy-1,4-pregnadiene-3,11-dione, 11β,21-dihydroxy-18,20β-epoxy-1,4-pregnadien - 3 - one, and 11β,18;18,20β-diepoxy-21-hydroxy-1,4-pregnadien - 3-one, respectively, and the corresponding 20α-epimers thereof. The 1-dehydro-21-hydroxy compounds thus produced can be acylated in accordance with the procedure of Example 7 to produce the corresponding 21-acylates of the above listed 1-dehydro-21-hydroxy compounds wherein the acyl radical is that of an acid listed in the third paragraph of Example 3.

We claim:
1. An 11β,18;18,20-diepoxy compound of the pregnane series having the formula:

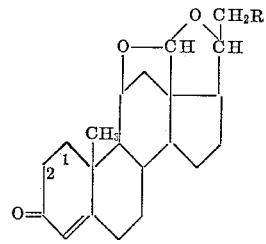

wherein R is selected from the group consisting of hydrogen, hydroxy and OAc in which Ac is the acyl radical of a hydrocarbon carboxylic acid containing from 1 to 12 carbon atoms, inclusive, the 1,2-carbon atom linkage is selected from the linkages consisting of single bond and double bond linkages and the configuration of the carbon to oxygen linkage at the 20-position is selected from the group consisting of the α-configuration and the β-configuration.

2. 11β,18;18,20β-diepoxy-4-pregnen-3-one.
3. 11β,18;18,20α-diepoxy-4-pregnen-3-one.
4. 11β,18;18,20β-diepoxy-1,4-pregnadien-3-one.
5. 11β,18;18,20α-diepoxy-21-hydroxy-4-pregnen-3-one.
6. An 11β,18;18,20-diepoxy compound of the pregnane series having the formula:

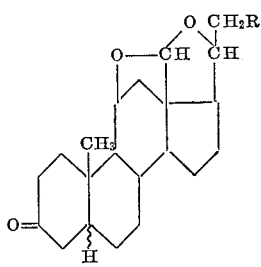

wherein R is selected from the group consisting of hydrogen, hydroxy and OAc in which Ac is the acyl radical of a hydrocarbon carboxylic acid containing from 1 to 12 carbon atoms, inclusive; and the configuration of the carbon to oxygen linkage at the 20-position is selected from the group consisting of the α-configuration and the β-configuration.

7. An 11β,18;18,20-diepoxy compound of the pregnane series having the formula:

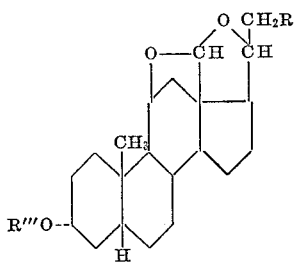

wherein the configuration of the carbon to oxygen linkage at the 20-position is selected from the group consisting of the α-configuration and the β-configuration; R is selected from the group consisting of hydrogen, hydroxy and OAc in which Ac is the acyl radical of a hydrocarbon carboxylic acid containing from 1 to 12 carbon atoms, inclusive; and R''' is selected from the group consisting of hydrogen and Ac in which Ac is defined as above; wherein when R''' is hydrogen, R is limited to hydroxy and hydrogen and when R''' is Ac, R is limited to OAc and hydrogen.

8. An 11β,18;18,20-diepoxy compound of the pregnane series having the formula:

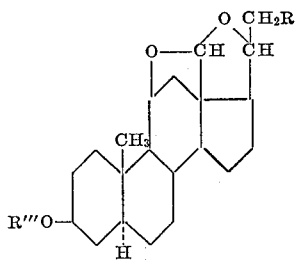

wherein the configuration of the carbon to oxygen linkage at the 20-position is selected from the group consisting of the α-configuration and the β-configuration; R is selected from the group consisting of hydrogen, hydroxy and OAc in which Ac is the acyl radical of a hydrocarbon carboxylic acid containing from 1 to 12 carbon atoms, inclusive, and R''' is selected from the group consisting of hydrogen and Ac in which Ac is defined as above; wherein when R''' is hydrogen, R is limited to hydroxy and hydrogen and when R''' is Ac, R is limited to OAc and hydrogen.

9. 11β,18;18,20β-diepoxy-5β-pregnan-3-one.
10. 11β,18;18,20β-diepoxy-5β-pregnan-3α-ol.
11. 11β,18;18,20α-diepoxy-5β-pregnan-3α-ol.
12. 11β,18;18,20α-diepoxy-5β-pregnane-3α,21-diol.
13. 11β,18;18,20β-diepoxy - 5β - pregnan-3α-ol 3-acetate.
14. 4β-chloro-11β,18;18,20β-diepoxy - 5β - pregnane-3-one.
15. A process for the production of an 11β,18;18,20-diepoxy compound of the formula:

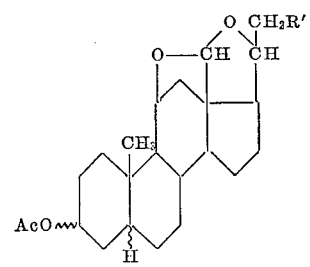

wherein Ac is the acyl radical of an organic carboxylic acid; R' is selected from the group consisting of hydrogen and OAc in which Ac has the same meaning as previously given; and the configuration of the carbon to oxygen linkage at the 20-position is selected from the group consisting of the α-configuration and the β-configuration, which comprises: subjecting a compound of the formula:

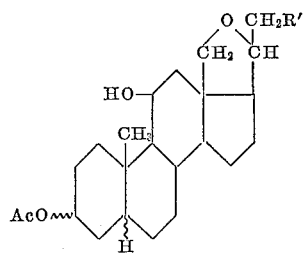

wherein Ac, R' and the configuration of the carbon to oxygen linkage at the 20-position are defined as above, to epoxidation with lead tetraacetate to produce the corresponding 11β,18;18,20-diepoxy compound.

16. A process for the production of an 11β,18;18,20-diepoxy compound of the formula:

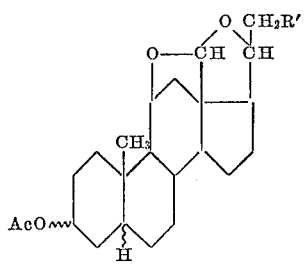

wherein Ac is the acyl radical of an organic carboxylic acid, and R' is selected from the group consisting of hydrogen and OAc in which Ac has the meaning previously given; and the configuration of the carbon to oxygen linkage at the 20-position is selected from the group consisting of the α-configuration and the β-configuration, which comprises; subjecting a compound of the formula:

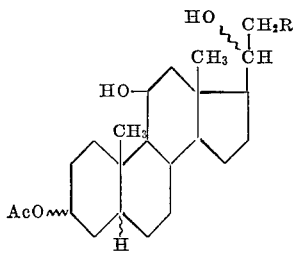

wherein Ac and R' are defined as above, to diepoxidation with lead tetraacetate to produce the corresponding 11β,18;18,20-diepoxy compound.

17. A process for the production of an 11β,18;18,20-diepoxy-4-pregnen-3-one of the formula:

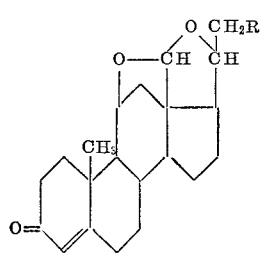

wherein R is selected from the group consisting of hydrogen, hydroxy, and OAc in which Ac is the acyl radical of an organic carboxylic acid; and the configuration of the carbon to oxygen linkage at the 20-position is selected from the group consisting of the α-configuration and the β-configuration, which comprises halogenating an 11β,18;18,20-diepoxy-5β-pregnan-3-one of the formula:

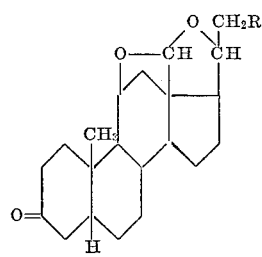

wherein R and the configuration of the carbon to oxygen linkage at the 20-position are defined as above, with a halogenating agent to produce the corresponding 4β-halo-11β,18;18,20-diepoxy-5β-pregnan-3-one and dehydrohalogenating the said 4β-halo compound thus obtained to produce the corresponding 11β,18;18,20-diepoxy-4-pregnen-3-one.

18. A process for the production of an 11β,18;18,20-diepoxy-4-pregnen-3-one of the formula:

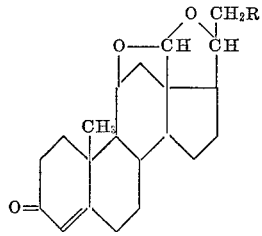

wherein R is selected from the group consisting of hydrogen, hydroxy and OAc in which Ac is the acyl radical of an organic carboxylic acid; and the configuration of the carbon to oxygen linkage at the 20-position is selected from the group consisting of the α-configuration and the β-configuration, which comprises: brominating an 11β,18;18,20-diepoxy-5α-pregnan-3-one of the formula:

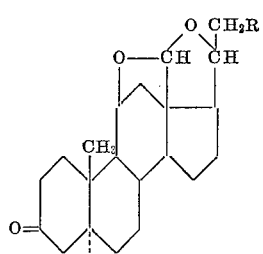

wherein R and the configuration of the carbon to oxygen linkage at the 20-position are defined as above, to produce the corresponding 2α,4α-dibromo-11β,18;18,20-diepoxy-5α-pregnan-3-one, dehydrohalogenating the said 2α,4α-dibromo compound with sodium iodide to produce the corresponding 2α-iodo-11β,18;18,20-diepoxy-4-pregnen-3-one and deiodinating the said 2α-iodo compound to produce the corresponding 11β,18;18,20-diepoxy-4-pregnen-3-one.

19. A process for the production of an 11β,18;18,20-epoxy-4-pregnen-3-one of the formula:

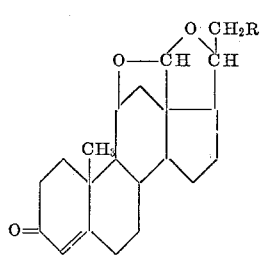

wherein R is selected from the group consisting of hydrogen, hydroxy, and OAc in which Ac is the acyl radical of an organic carboxylic acid; and the configuration of the carbon to oxygen linkage at the 20-position is selected from the group consisting of the α-configuration and the β-configuration, which comprises: subjecting an 11β-hydroxy-18,20-epoxy-4-pregnen-3-one 3-alkylene ketal of the formula:

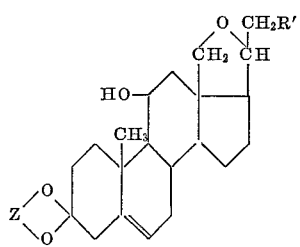

wherein R' is selected from the group consisting of hydrogen and OAc in which Ac is defined as above; Z is an alkylene radical containing from 2 to 8 carbon atoms, inclusive, and having from 2 to 3 carbon atoms, inclusive, in the chain connecting the oxygen atoms; and the configuration of the carbon to oxygen linkage at the 20-position is defined as above, to epoxidation with lead tetraacetate to produce the corresponding 11β,18;18,20-diepoxy-4-pregnen-3-one 3-alkylene ketal, hydrolyzing the said 11β,18;18,20-diepoxy 3-alkylene ketal thus obtained in the presence of an acid to produce the corresponding 11β,18;18,20 - diepoxy-4-pregnen-3-one and hydrolyzing the 21-acylates thus obtained in the presence of base to produce the corresponding 21-free alcohols.

20. A process for the production of an 11β,18;18,20-diepoxy-4-pregnen-3-one of the formula:

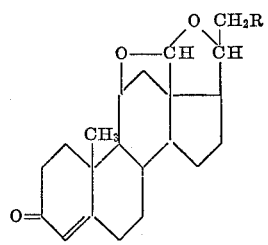

wherein R is selected from the group consisting of hydrogen, hydroxy and OAc in which Ac is the acyl radical of an organic carboxylic acid and the configuration of the carbon to oxygen linkage at the 20-position is selected from the group consisting of the α-configuration and the β-configuration, which comprises: subjecting an 11β,20-dihydroxy-4-pregnen-3-one 3-alkylene ketal of the formula:

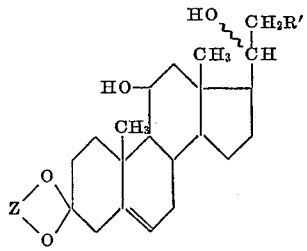

wherein R' is selected from the group consisting of hydrogen and OAc in which Ac is defined as above; and Z is an alkylene radical containing from 2 to 8 carbon atoms, inclusive, and having from 2 to 3 carbon atoms, inclusive, in the chain connecting the oxygen atoms, to diepoxidation with lead tetraacetate to produce the corresponding 11β,18;18,20-diepoxy-4-pregnen-3-one 3-alkylene ketal, hydrolyzing the said 11β,18;18,20-diepoxy 3-alkylene ketal thus obtained in the presence of an acid to produce the corresponding 11β,18;18,20-diepoxy-4-pregnen-3-one and hydrolyzing the 21-acylates thus obtained in the presence of a base to produce the corresponding 21-free alcohols.

21. A process for the production of an 11β,18:18,20-diepoxy-1,4-pregnadien-3-one of the formula:

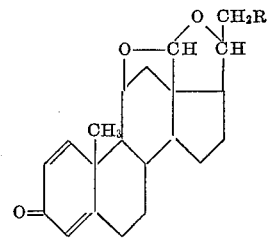

wherein R is selected from the group consisting of hydrogen, hydroxy and OAc in which Ac is the acyl radical of an organic carboxylic acid, and the configuration of the carbon to oxygen linkage at the 20-position is selected from the group consisting of the α-configuration and the β-configuration, which comprises: subjecting an 11β,18;18,20-diepoxy-4-pregnen-3-one of the formula:

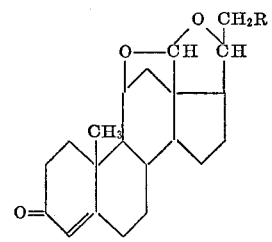

wherein R and the configuration of the carbon to oxygen linkage at the 20-position are defined as above, to 1-dehydrogenation to produce the corresponding 11β,18;18,20-diepoxy-1,4-pregnadien-3-one.

References Cited by the Examiner
UNITED STATES PATENTS 3,085,089   4/63   Wettstein et al. _____ 260—397.45

OTHER REFERENCES

Heusler et al., "Helv. Chim. Acta.," vol. XLV, No. 39, February 1, 1962, pp. 347–350.

Kelly et al., "Biochemistry," vol. 1, No. 1, January 1962, pp. 172–181.

Schmidlin et al., "Helv. Chim. Acta.," vol. XLV, No. 38, February 1, 1962, pp. 331–347.

LEWIS GOTTS, *Primary Examiner.*